United States Patent [19]

Jensen et al.

[11] 4,082,943
[45] Apr. 4, 1978

[54] METHOD AND APPARATUS FOR READ AND PRINT DATA

[75] Inventors: Gerald A. Jensen, Wayzata; Ronald B. Harvey, Minneapolis; Patrick J. Caulfield, Wayzata; Dwayne H. Putzke, Brooklyn Center; Gerald R. Strunc, Maple Grove, all of Minn.

[73] Assignee: Pako Corporaton, Minneapolis, Minn.

[21] Appl. No.: 714,174

[22] Filed: Aug. 13, 1976

[51] Int. Cl.² .................. G06F 11/00; G06K 1/12
[52] U.S. Cl. ........................... 235/303.1; 235/463; 340/146.3 Z
[58] Field of Search .......... 235/153 AH, 153 AS, 235/61.11 E, 61.7 B, 61.9 R; 340/146.1 BA, 146.1 F, 146.3 Z; 360/77

[56] References Cited

U.S. PATENT DOCUMENTS

| | | |
|---|---|---|
| 3,263,216 | 7/1966 | Andrews ............ 340/146.3 D |
| 3,340,505 | 9/1967 | Scott ............ 340/146.1 BA |
| 3,414,880 | 12/1968 | Humphrey ............ 340/146.1 F |
| 3,585,589 | 6/1971 | Reilly ............ 340/146.3 Z |
| 3,655,948 | 4/1972 | Spauszus ............ 235/61.9 R |
| 3,743,819 | 7/1973 | Kapsambelis et al. ..... 340/146.1 BA |
| 3,919,697 | 11/1975 | Walker ............ 360/77 |
| 3,947,660 | 3/1976 | Saito ............ 235/61.9 R |

Primary Examiner—Charles E. Atkinson
Attorney, Agent, or Firm—John W. Adams

[57] ABSTRACT

A system and method for reading machine-readable information from a carrier and printing information onto said carrier or other means is presented. The system comprises a reader means, storage means, printer means, enable means, read repeat means and annunciator means. Circuitry is provided for determining when an unsuccessful scan has resulted and thereafter commanding a rescan of the code until a successful scan is obtained or a predetermined limited number of unsuccessful rescans have been completed. The system may include means for modifying the relative position of the scanning means with respect to the carrier during successive rescans. When successful read and print cycles are completed, the carrier means is positioned appropriately for human retrieval. An annunciator means is employed to signal the human controller when the allowable number of rescans has been exhausted without successfully reading the coded information. The system further provides apparatus for adjusting the alignment of the printer means.

17 Claims, 26 Drawing Figures

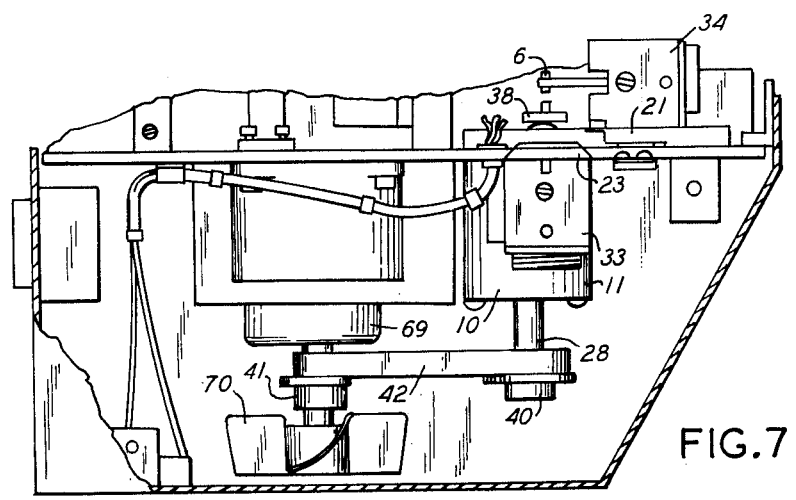
FIG. 7
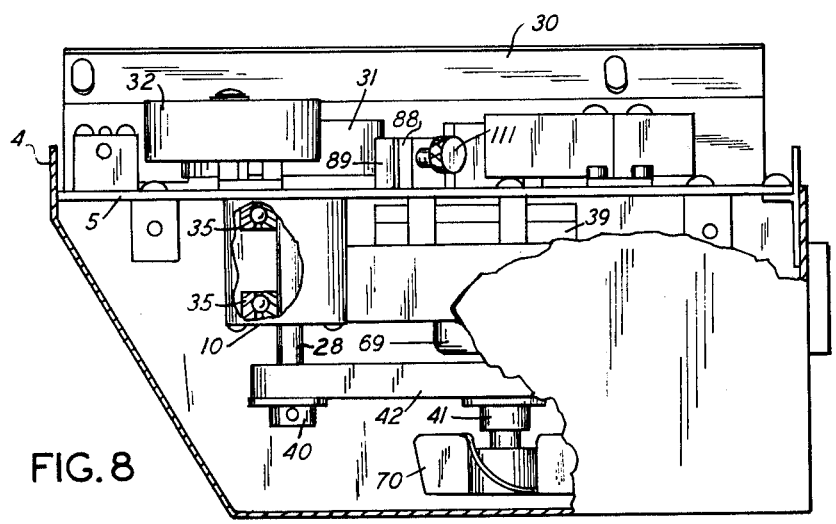
FIG. 8
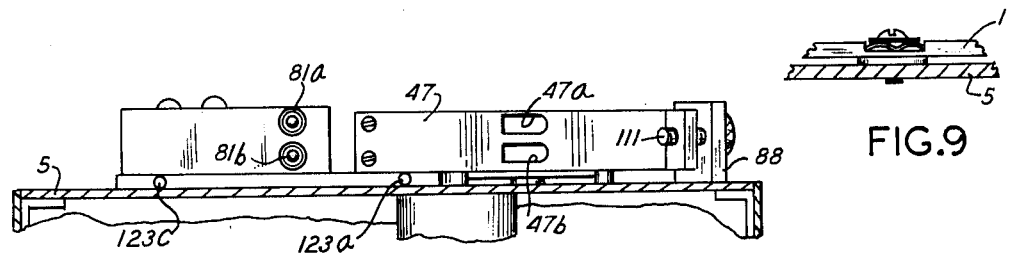
FIG. 9
FIG. 10

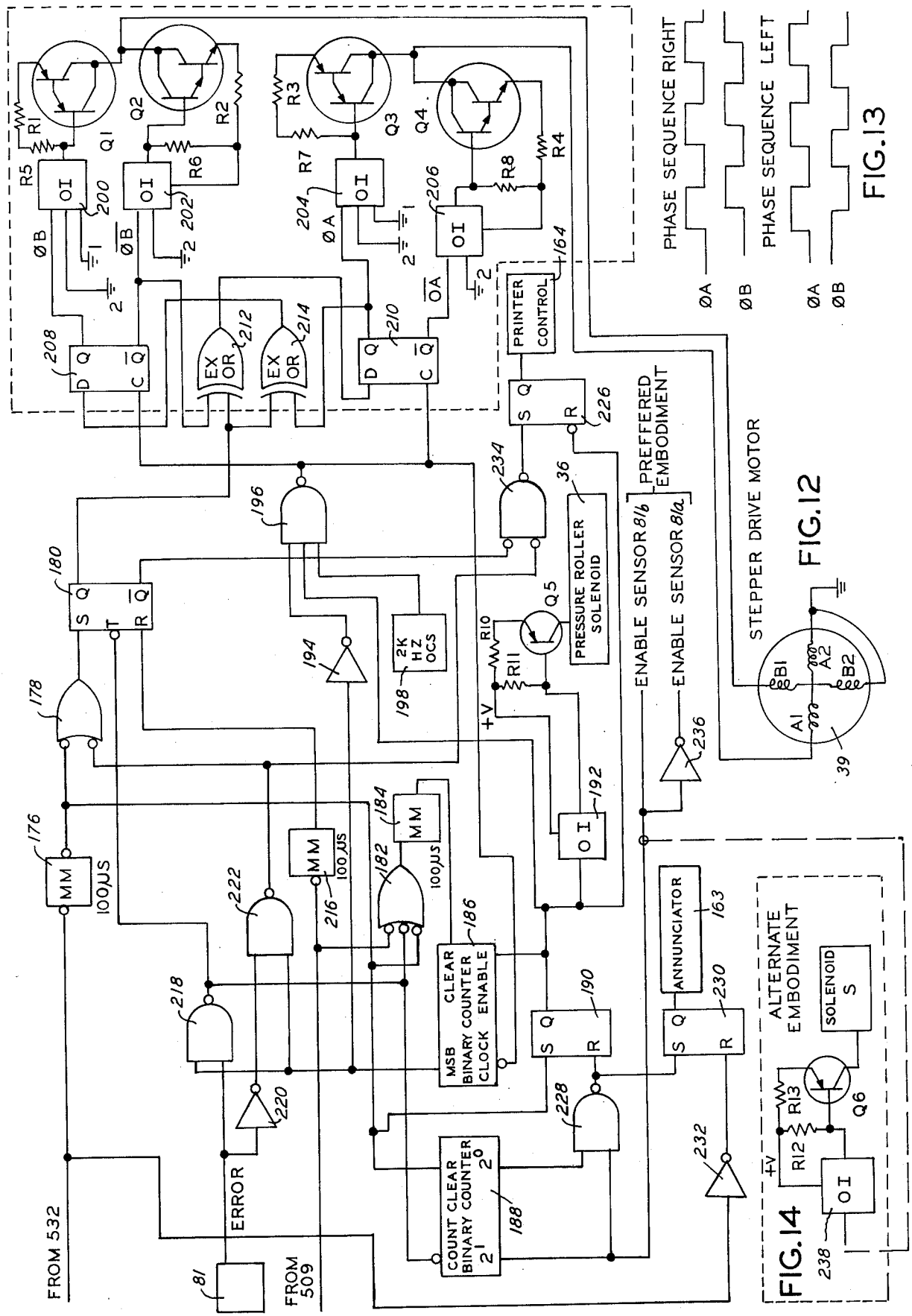

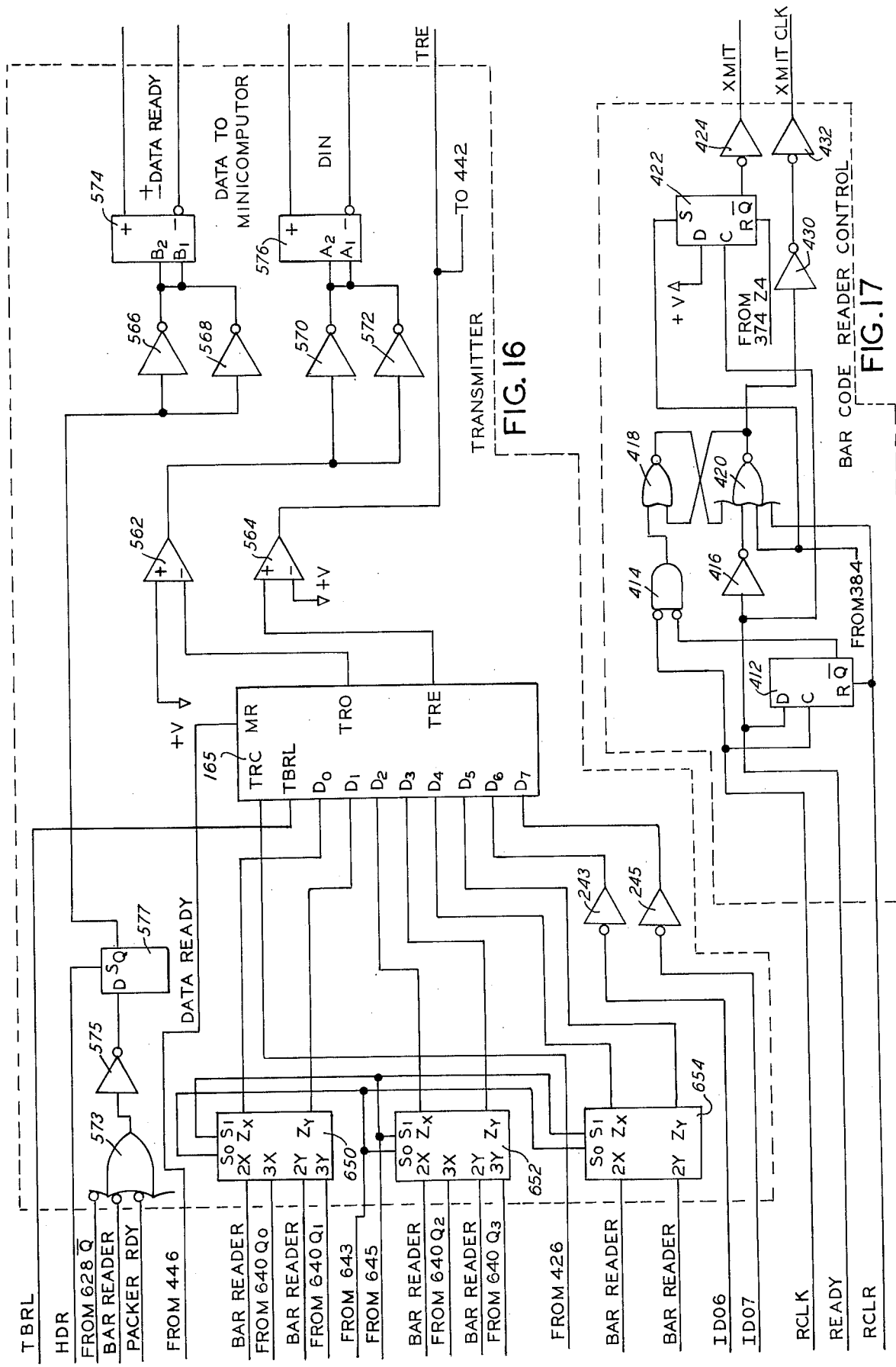

DIGIT DISPLAY

KEYBOARD

METHOD AND APPARATUS FOR READ AND PRINT DATA

BACKGROUND OF THE INVENTION

The present invention pertains to improved methods and apparatus for reading and printing data. The invention is particularly useful as a new concept in computer based systems for order handling and billing in the photographic industry. Such systems are designed to price all the work in a photographic processing plant while maintaining a data base for work in process and collecting data necessary to provide daily invoicing for completed orders.

In manual or semi-automatic operations an impediment in the work flow frequently occurs upon completion of processing. Negatives and prints are processed and the prints are evaluated as either good, remake or reject prints. Next, the orders are assembled and the prints and negatives are matched to the original customer order envelope. The orders must then be priced and the pricing data saved to produce dealer invoices, statements and management reports.

These operations are problematical when a photo-finisher has between 100 and 200 different types of work on a single price schedule. Further complicating the task, different methods of pricing may be offered for each type of work. For example, a develop only charge, develop and print charge, or different unit prices as the number of prints ordered increases, must be introduced into the computation of the price of each order being processed.

Modern machines have a faculty for handling media bearing machine readable encoded information relating to: identification of the source of the media, citing specific processing steps to be performed on the media or its contents, defining the pricing schedule to be applied to the finished goods and specifying the destination of the completed product. The quantity of media being processed by such a machine eliminates the feasibility of utilizing human reading of the media. Frequently the indicia are erroneously read on the first attempt as a result of ambient electrical or electro-magnetic interference or exposing the media to improper handling and storage conditions. For many years the necessity for an alternative to rejecting the erroneously read media as been well recognized. In past instances, the information was manually re-entered upon first rejection; however, this action interrupted the normal rhythm of the high speed continuous process being carried out in such machines.

Alignment of multiple printer hammers relative to the respective multiple character bearing portions of the printer wheel means is critical if human readable printing is to result. In the past, separate adjustment of each printer hammer was accomplished by moving each hammer apparatus after loosening the mounting screws which positioned that specific hammer. This action allowed each hammer to move freely and this movement was not restricted to a single plane due to the tolerance of the screws and adjustment slots. Therefore, it was a difficult and time-consuming task to effect the proper adjustment of all of the printer hammers to the required tolerances.

The printing means requires close tolerance between the hammers and the printer wheel. The carrier must pass through a guide slot in order to have the interpreted information printed on it, yet the carriers frequently have been folded or have dogeared corners. As a result, the printing operation has been plagued with numerous carrier jams.

SUMMARY OF THE INVENTION

The system of the present invention overcomes the problem of unsuccessful scans by providing a faculty for automatically producing a predetermined number of rescans of the coded information prior to relying on human intervention. As a result, the number of unreadable documents is markedly reduced, thus reducing the number of interruptions to the process and thereby enhancing the output capability of the system.

The adjustment system of the present invention overcomes the problems of prior systems by providing adjustment apparatus which guarantees that all the printer hammers move together for the adjustment of the hammers both normal to the printing plane and parallel therewith.

The system of the present invention overcomes the tolerance problem by providing a character wheel shield constructed to flatten the dogeared corners and the improperly folded envelopes sufficiently to allow the carrier to pass into and through the printing station without jamming while permitting the hammers to print therethrough.

The novel features which are characteristic of this invention are set forth with particularity in the appended claims.

The invention itself, however, both as to its organization and method of operation, together with further advantages thereof, may be best understood by reference to the following description taken in conjunction with the accompanying drawings in which:

FIG. 7 is a rear elevation with the portions removed to illustrate detail;

FIG. 8 is a front elevational view with portions removed to illustrate detail;

FIG. 9 is a fragmentary vertical sectional view of the arm mounting;

FIG. 10 illustrates the detail of the printer wheel, printer wheel shield and multiple bar code sensor elements as viewed along the line 10-10 in FIG. 5;

FIG. 12 is an electrical schematic of the stepper motor drive and alternate scanning path selection electronics;

FIG. 13 illustrates the phase relationship required for right and left transportation of the carrier;

FIG. 14 is an electrical schematic of an alternate embodiment of a means of modifying the sensor scanning path;

FIG. 16 is an electrical schematic of the transmitter 165 and attendant electronic components;

FIG. 17 is an electrical schematic of the reader control portion of the pricing terminal controller 160 and attendant electronic components;

Figure 18:
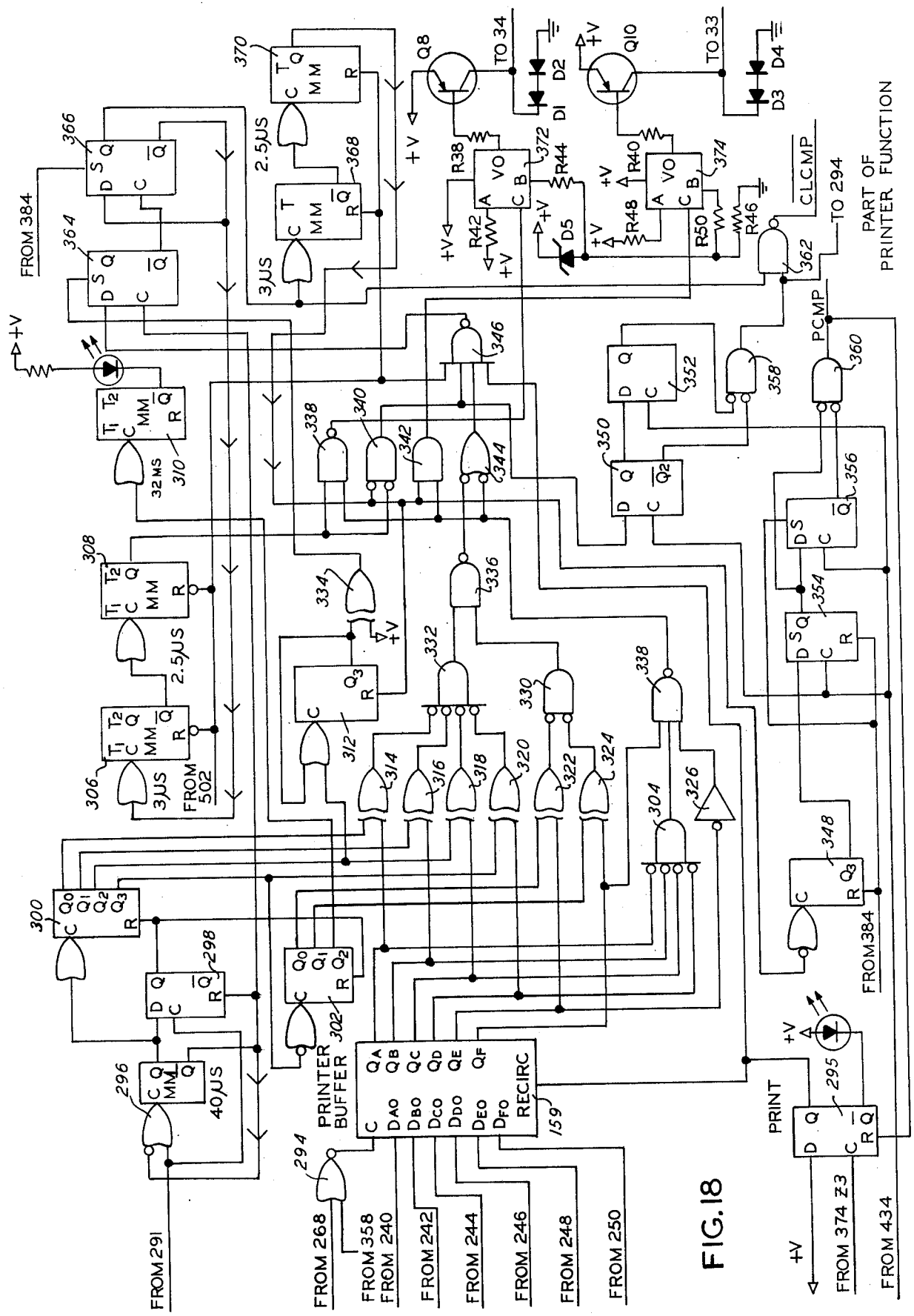
Figure 19:
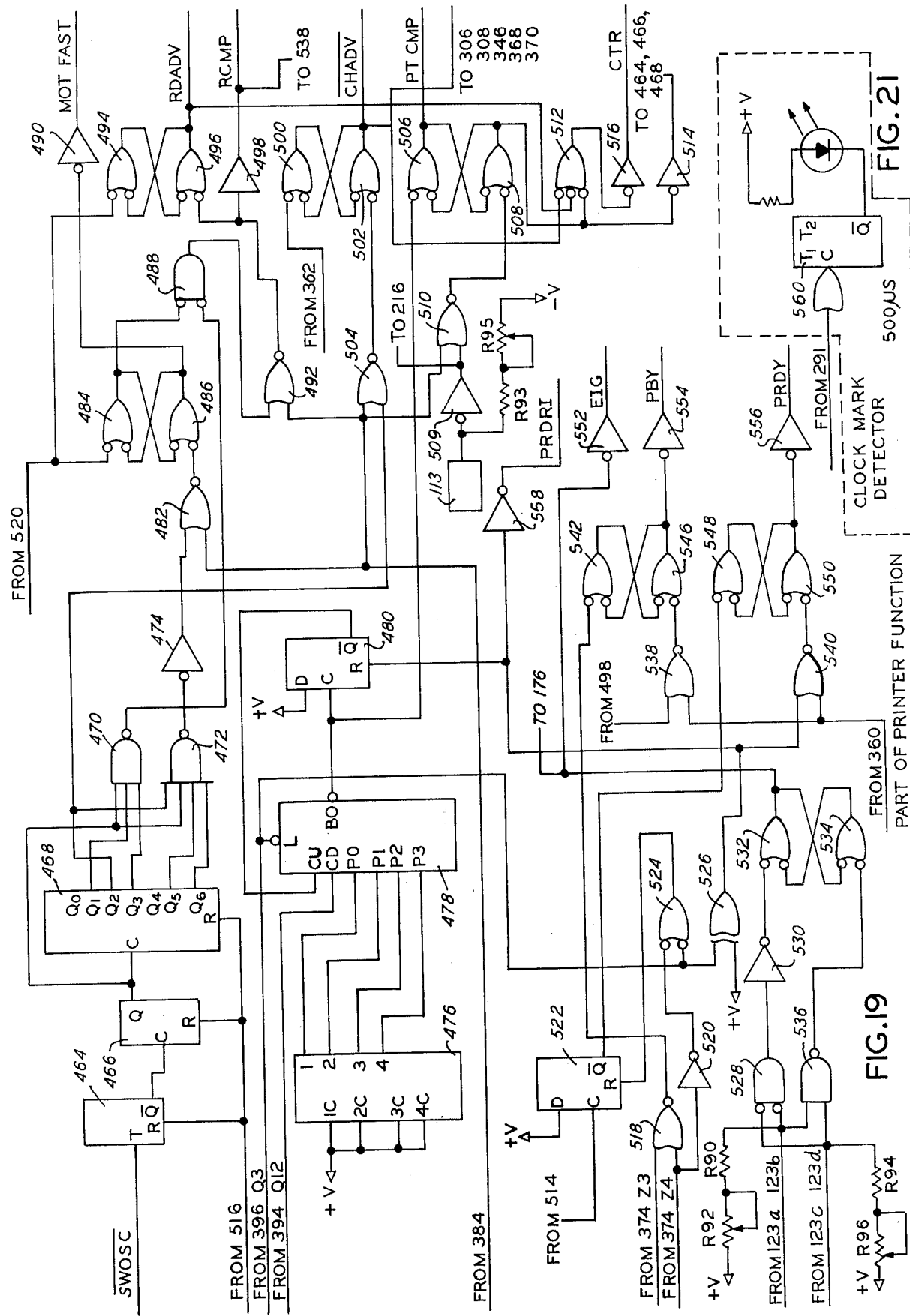
Figure 20:
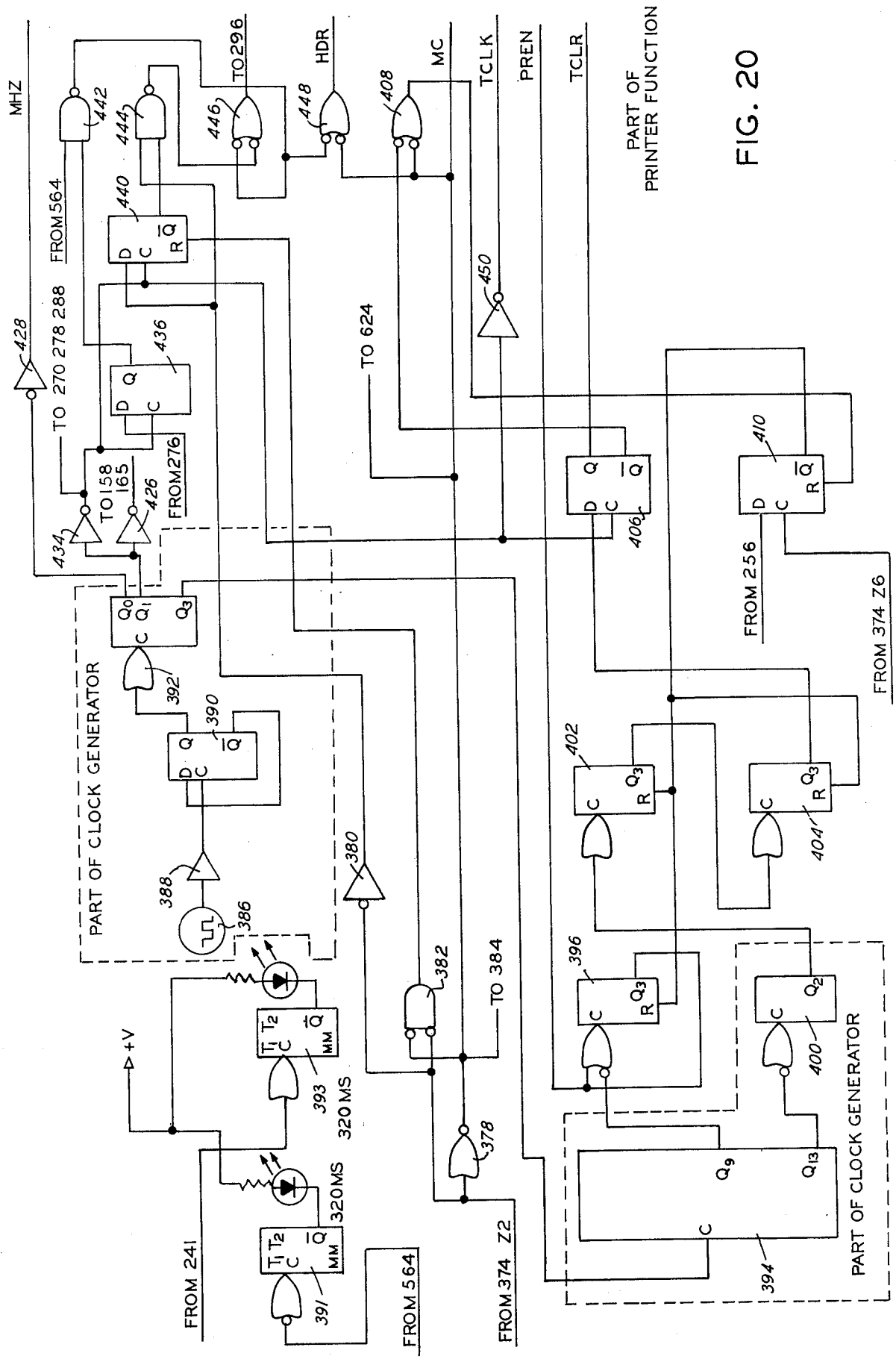
Figure 22:
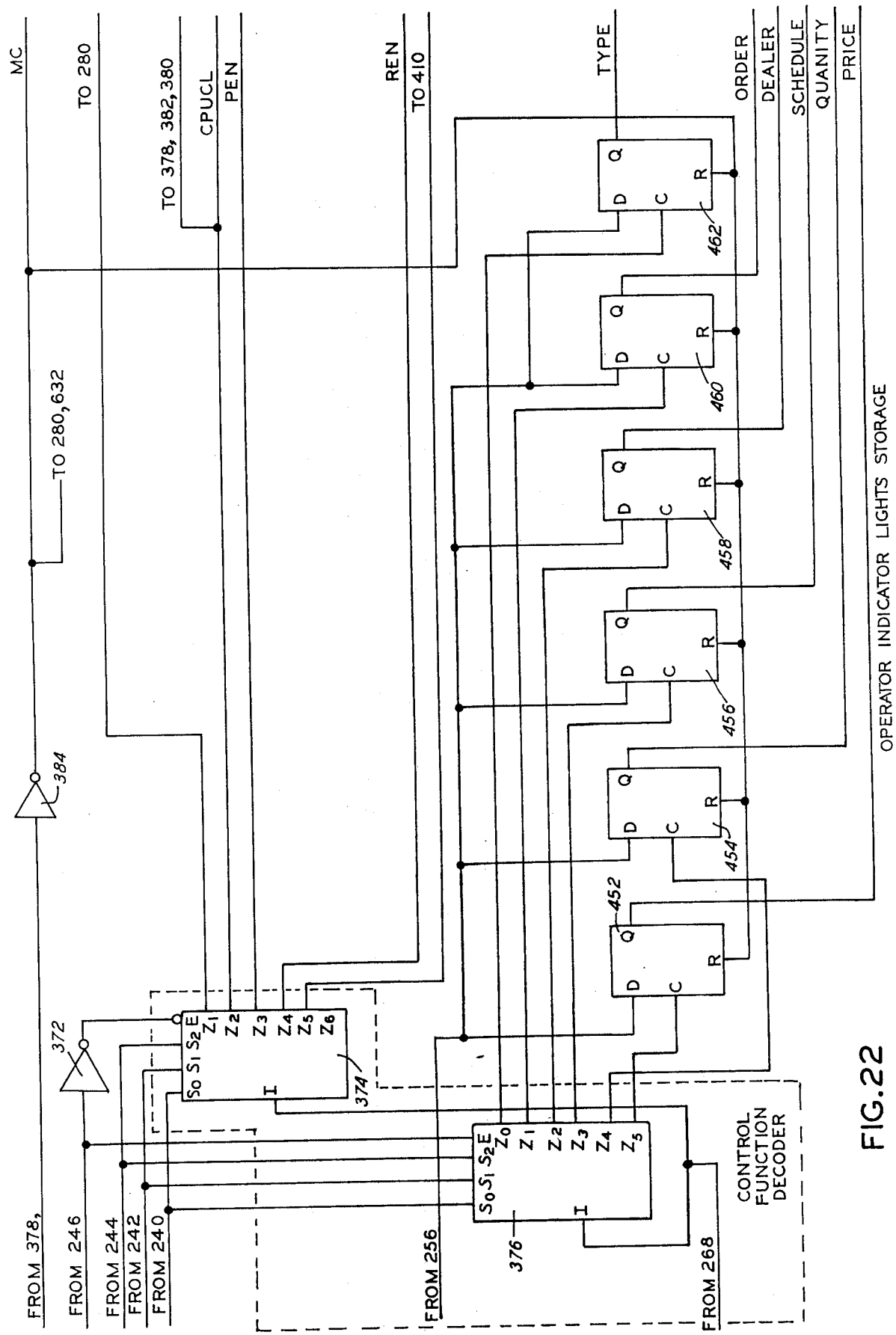
Figure 25:
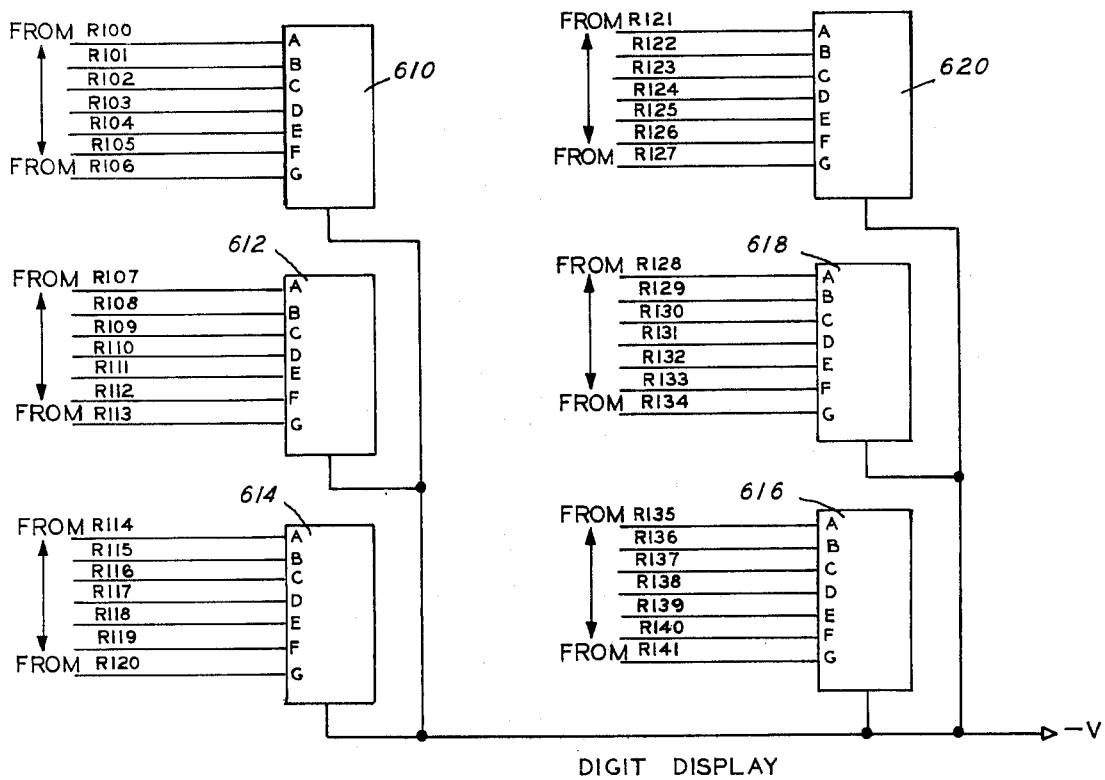
Figure 23:
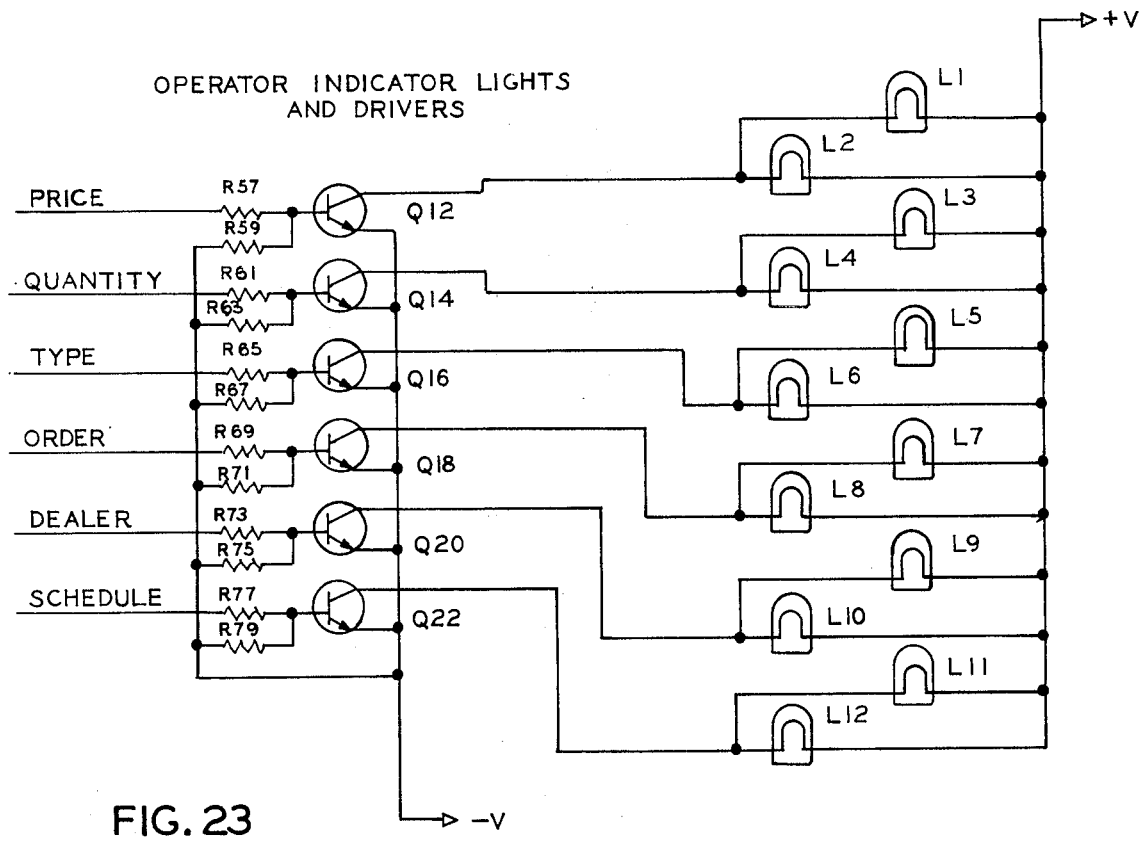
Figure 24:
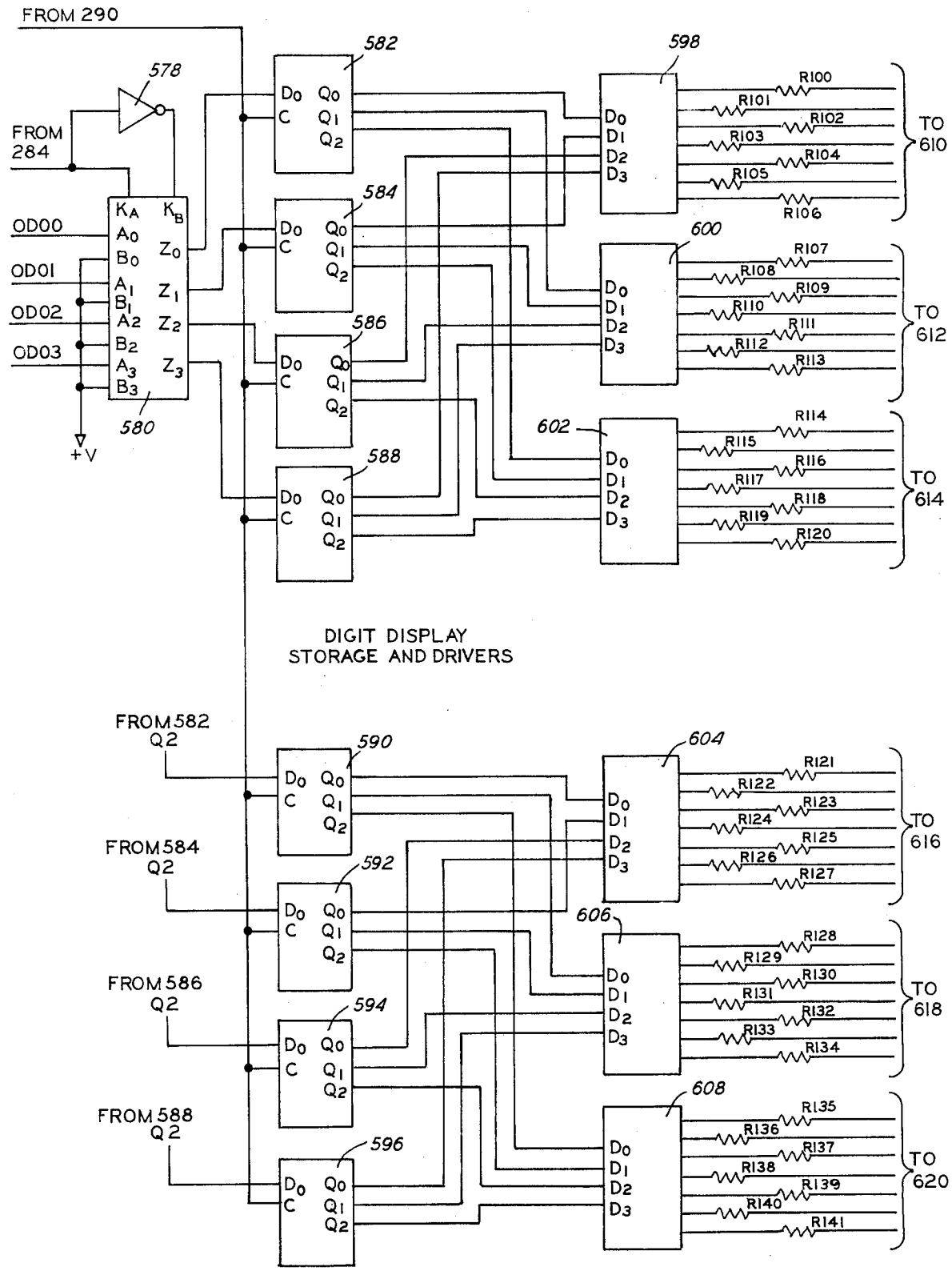
Figure 26:
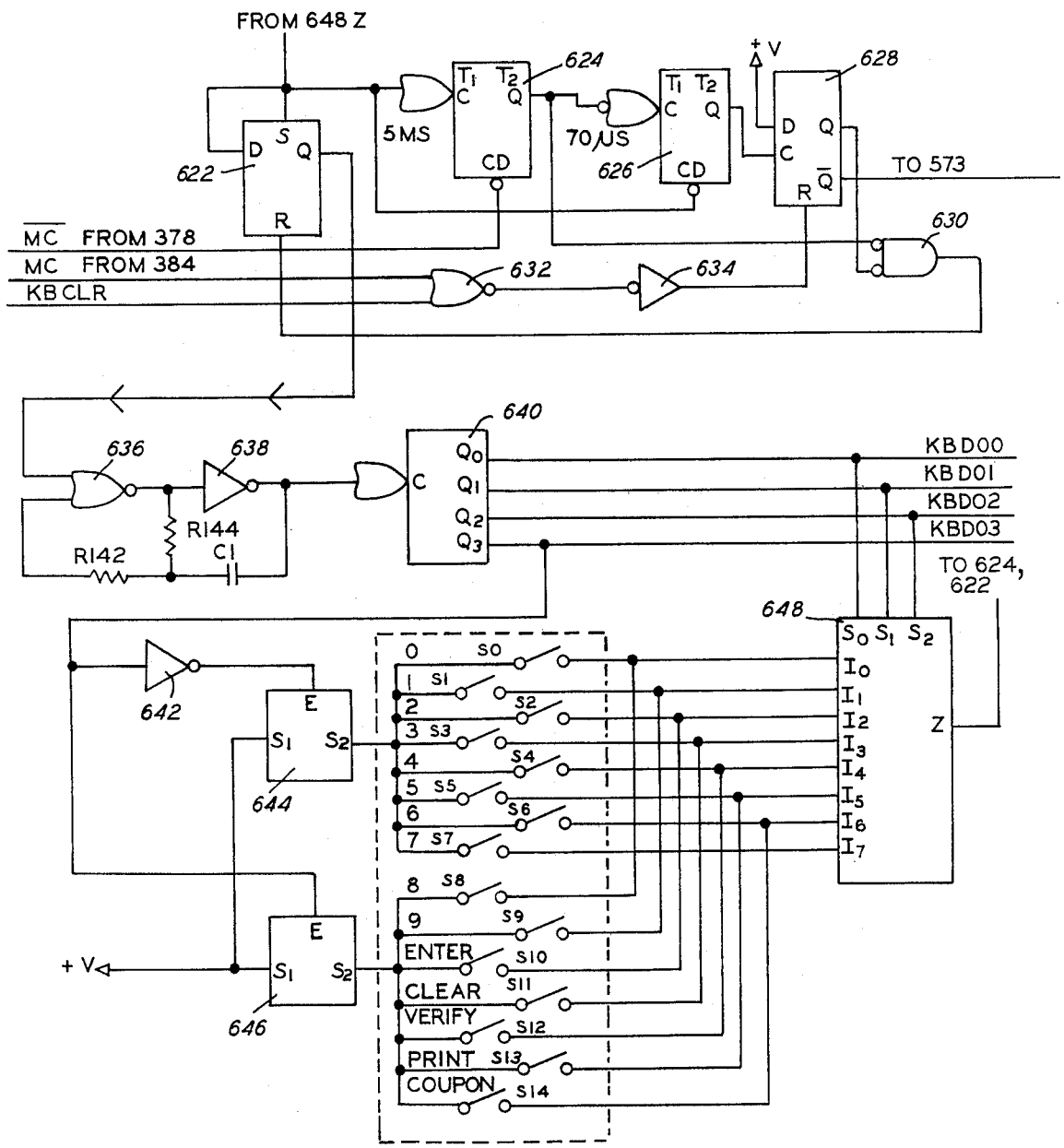

FIG. 18 is an electrical schematic of the printer buffer 159; printer control 161 and printer 162 and attendant electronic component;

FIG. 19 is an electrical schematic of a portion of the pricing terminal collector 160 illustrating the printer function control and attendant electronics;

FIG. 20 is an electrical schematic illustrating portions of the pricing terminal controller 160 and attendant electronics;

FIG. 21 is an electrical schematic illustrating the clock mark generator and attendant electronics;

FIG. 22 is an electrical schematic illustrating the storage devices for the operator indicator light function 155 and annunciator 163 and attendant electronics;

FIG. 23 is an electrical schematic illustrating the display elements for the operator indicator lights 155 and associated drive components;

FIG. 24 is an electrical schematic illustrating the digit display 156 storage and decoder drivers;

FIG. 25 is an electrical schematic illustrating the display elements for the digit display 156; and FIG. 26 is an electrical schematic illustrating the keyboard 154 and attendant electronics.

Figure 3:
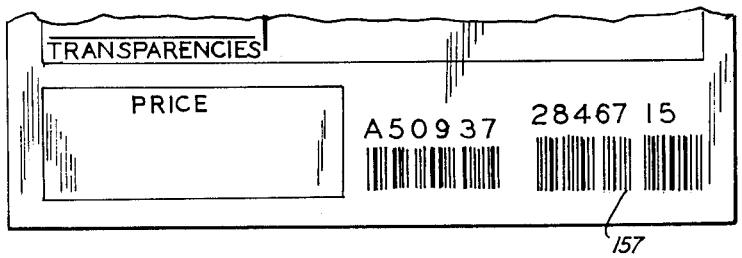
FIG. 3 is an exhibit of the lower portion of an exposed film carrier.
Figure 1:
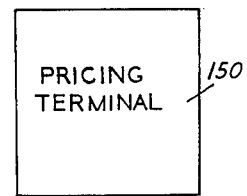
FIG. 1 is diagrammatic view showing a typical pricing system equipment configuration.
Figure 2:
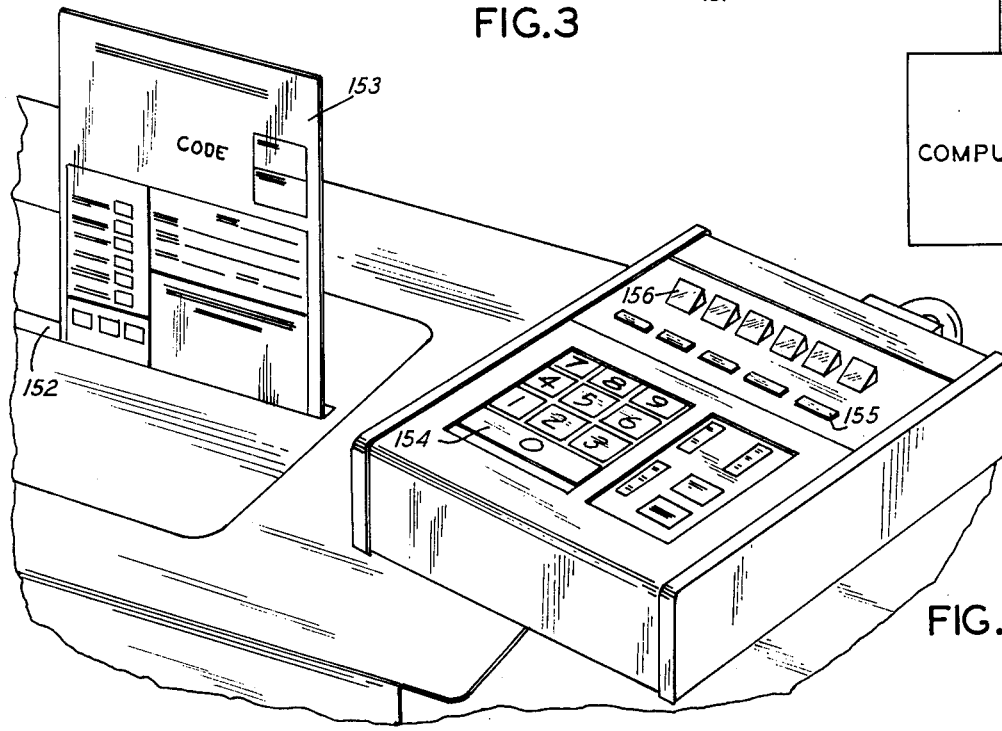
FIG. 2 is a perspective view showing a typical pricing terminal.
Figure 4:
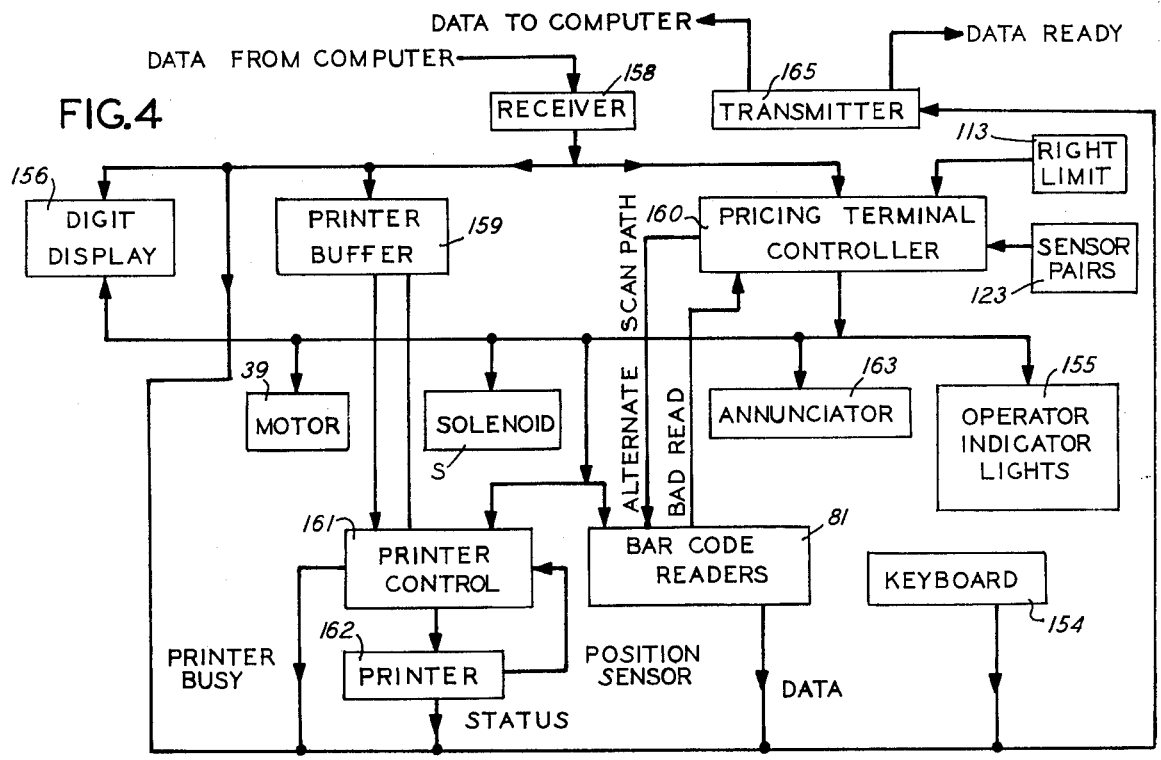
FIG. 4 is a block diagram of the functional elements of the reader pricing terminal.

A pricing terminal 150 is best shown in FIGS. 1 and 2 and operates in concert with a computer 151 as FIG. 1 illustrates. FIG. 2 shows the general arrangement of the pricing terminal 150 including slot 152 for insertion of a carrier such as envelope 153, keyboard 154 used for manual data entry, indicators 155 and digit display 156. The bar coded information 157 is printed on the lower portion of the film order envelope or carrier 153, as shown in FIG. 3. FIG. 4 illustrates the functional elements for pricing terminal 150.

In FIG. 4, a receiver 158 converts the serial data from computer 151 to parallel data and provides said parallel data as input to the digit display 156, printer buffer 159 and the pricing terminal controller 160. The pricing terminal controller 160 provides strobe control for the storage of information in the digit display 156 and printer buffer 159. The pricing terminal controller 160 further converts input data to a format suitable for input to the buffer for the operator indicator lights 155.

Character data is input to the printer buffer 159 from the receiver 158 and is stored in 6-bit American Standard Code for Information Interchange (ASCII) formatted words. Character storage is organized beginning with the last column of the first row and ends with the first column of the second row. Character data alternates between first row and second row.

Printer control 161 correlates the character codes output from printer buffer 159 with position information from printer 162 and energizes the desired printer hammer. After a character is printed, the printer control 161 advances the printer buffer 159 one character position.

The printer 162 provides two rows of ASCII coded characters. The character wheel position is determined by a magnetic sensor 109 which detects position marks on the lower section of the wheel. Print hammers 36 and 6 are energized by the printer control 161 when wheel 31 is correctly positioned.

Operator indicator lights 155 display information relating to type, order, dealer, schedule, quantity and price.

A conventional sensor 81, typical of which is Monarch Marking System M-2243, acquires data from bar code 157 of FIG. 3 and transmits ASCII coded data upon command. Data transfer is inhibited when an erroneous read is detected.

Keyboard 154 provides a means of manually entering data. The transmitter 165 provides conversion of the parallel data received to a serial format and further provides the necessary interfacing timing.

Figure 5:
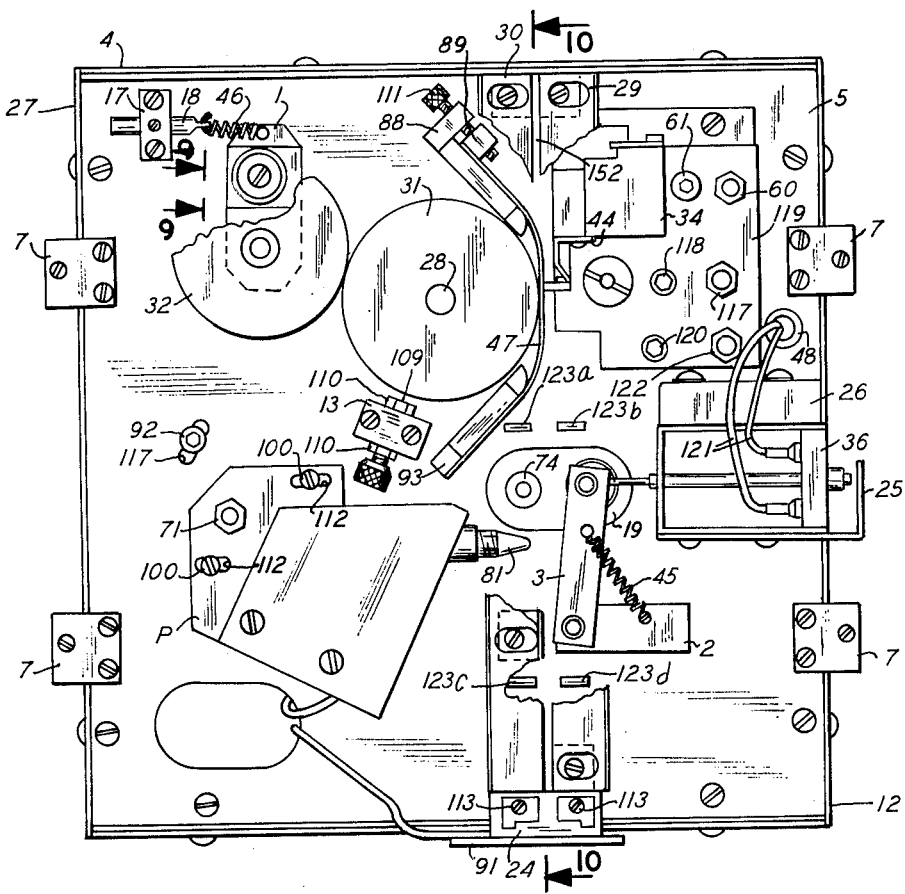
FIG. 5 is a top plan view of the reader-printer apparatus embodying the invention with portions broken away.
Figure 6:
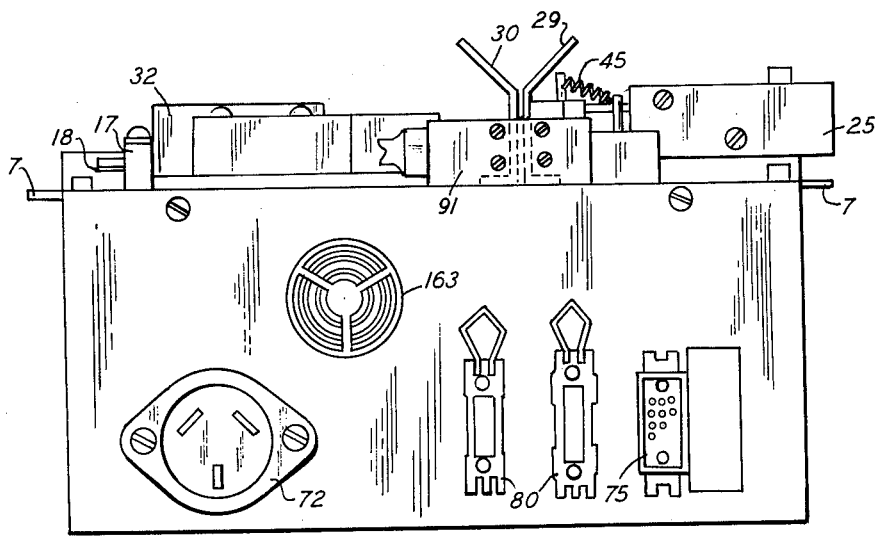
FIG. 6 is a right end elevation thereof.

The reader printer apparatus is shown in FIGS. 5–10 and includes a base plate 5 to which cabinet assembly 4, back plate 12, front plate 27 and printer mounting bracket 7 are attached as shown in FIG. 5. Connectors 72 and 74, illustrated in FIG. 6, provide means for electrical interconnection of the terminal to other system components and are mounted on the cabinet 4 as are the spring latches 80 and annunciator means 163.

FIG. 8 illustrates that further attached to the base plate 5 is the drive motor assembly 69, to which is attached cooling fan blade 70 and timing belt drive sprocket 41. Print wheel shaft 28 is rotatably mounted on the base plate 5 via the bearing mount 11, bearings 35 and thrust plate 10. Attached to the print wheel shaft 28 is a timing belt sprocket 40 and print wheel 31. Timing belt 42 transmits torque from the motor assembly 69 to the print wheel shaft 28 in conjunction with sprockets 40 and 41. The tension on said timing belt being adjusted by rotating drive motor 69 while mounting screw 92 of FIG. 5 is in a loosened state, thus enabling said screw to travel in elongated slot 117 provided in base plate 5. Ink wheel 32, of FIG. 5, being complete with bearings, is also mounted on base plate 5 by the mount assembly 1, details of the pivot assembly being shown in FIG. 9. The ink wheel 32 is maintained in contact with the printer wheel 31 by spring 46, which is attached to base plate 5 by adjustment block 17 and spring retainer 18. A sensor mount 13, best shown in FIG. 5, is attached to base plate 5, thus providing support for magnetic sensor 109, which is radially adjustable with respect to the circumference of the print wheel 31, as by a pair of clamping nuts 110 which engage the threaded barrel of said sensor 109 and clamp same to the mount 13.

Again referring to FIG. 5, the left print wheel shield guide assembly 88 and the right print wheel shield guide assembly 93 are attached to base plate 5. The print wheel shield 47 is secured to the right print wheel shield guide 93 and the print wheel shield take-up bar assembly 89, said take-up bar assembly being adjustably attached to the left shield guide assembly by adjusting screw 111. Said print wheel shield 47 having two elongated openings 47a and 47b configured as shown in FIG. 10 and positioned to register with the character on the print wheel 31 when said characters are located in printing position.

Front guide assembly 30 and rear guide assembly 29 are also attached to base plate 5 in a manner to define slot 152 as illustrated in FIG. 5, the front guide assembly 30 being relieved to provide a means for bar code sensor assemblies 81 to scan said bar code 157 when said carrier 153 is inserted in said slot 152. Guide plate assemblies 29 and 30 have two pairs of carrier position sensors 123 mounted thereon. Light emitting diodes 123a and 123c are mounted on plate assembly 30 and rear guide plate assembly 29 has a pair of light sensing elements 123b and 123d, said position sensors 123 being located as illustrated in FIG. 5. Right limit sensor 113 is mounted on printed circuit assembly 91, which is attached to sensor bracket 24 and in turn to said base plate 5.

As further illustrated in FIG. 10, bar code sensor assemblies 81a and 81b are attached to the base plate 5 in a manner to facilitate adjustment of said sensors normal to slot means 152 previously described, said adjustments being accomplished by rotating eccentric nut 71 of FIG. 5 while mounting screws 100 are in a loosened state in the elongated slots 112, which are machined in the bar code sensor assembly base plate P.

Substantially improved results have been achieved by varying the path of the sensor across the coded information. This may be accomplished by supplying two or more vertically spaced sensors, such as sensors 81a and 81b as shown in 10. The circuitry for selecting the desired sensor to read said coded information is included in the pricing terminal controller 160 best illustrated in FIGS. 4 and 12.

Figure 11:
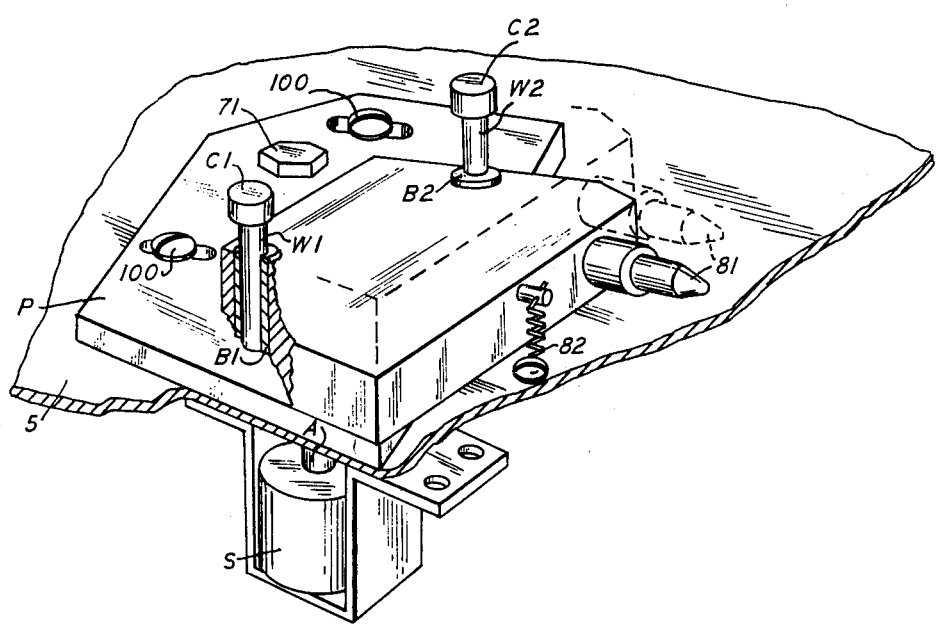
FIG. 11 is a fragmentary perspective view illustrating an alternate means of modifying the read position of a single bar code element.

A second embodiment to provide an alternate scanning path for re-scans is illustrated in FIG. 11. In this mechanization the commercially available bar code sensor assembly 81, typical of which is Monarch Marking Systems Model M-2243, has been fitted with linear bearings B1 and B2, bearing B1 being removed in FIG. 11 to illustrate mounting detail. The sensor assembly 81 with bearings B1 and B2 installed is slidably mounted with fixed guide rods W1 and W2 passing therethrough. Said guide rods W1 and W2 are fixed to the bar code sensor assembly base plate P. A solenoid S is mounted on the underside of base plate 5, the armature A of said solenoid S extends through a clearance hole in said base plate 5 and is constructed and positioned so as to be connected to said sensor assembly 81. When solenoid S is in a deenergized state, a return spring 82 maintains the sensor assembly 81 in contact with said sensor assembly base plate P. When solenoid S is in the energized state sensor assembly 81 is moved to the alternate position above the plate P, as indicated by the broken line position shown in FIG. 11.

The position of said sensor assembly 81 is adjusted normal to slot means 152 by rotating eccentric 71 with screws 100 in a loosened state. In the lower or normal position sensor assembly 81 is in contact with the sensor assembly base plate P while in the upper or alternate position said sensor assembly 81 is adjusted by moving stop collars C1 and C2 respectively.

In the form shown, solenoid S is controlled by a pricing terminal controller 160 illustrated in FIG. 4.

Motor assembly 39 is attached to said base plate as illustrated in FIG. 8, the shaft of said motor extending through a hole provided in said base plate, being positioned such that when fitted with the drive roller assembly 74 of FIG. 5 the circumference of said drive roller is protruding through a relief hole provided in the front guide assembly 30 and tangent to the front extremity of the slot 152. Solenoid 36 of FIG. 5 is attached to solenoid mount 26 which in turn is mounted on base plate 5. Pressure roller assembly 19 being complete with bearings and mounting means is attached to the pressure roller arm 3 which is in turn attached to the pivot block assembly 2 being mounted on base plate 5. Take-up spring 45 is attached between a provision on pressure roller arm 3 and pivot block assembly 2 in a manner to maintain pressure roller assembly 19 in a retracted position. A relief means is provided in the rear guide assembly 29 such that when pressure roller assembly 19 is in an extended position, said pressure roller will be in contact with said drive roller assembly 74, without interference. Solenoid mount 26 is positioned such that when solenoid 36 is properly attached the armature of said solenoid will contact the pressure roller arm assembly 3 and cause extension of said assembly through the relief means provided in the rear guide assembly 29. When said solenoid is energized, energizing current to said solenoid is provided by electrical conductors 121 which pass through base plate 5 and are protected by grommet 48. The retraction of the solenoid armature being limited by solenoid armature stop 25.

As illustrated in FIG. 7, upper printer hammer assembly 34 is mounted on the top hammer slide 21, which is configured such that only motion parallel to the slot formed by guide plates 29 and 30 and parallel to the plane of base plate 5 is possible, said motion being effected by rotating eccentric nut 60 of FIG. 5 while locking screw 61 is in a loosened state. Lower printer hammer assembly 33 of FIG. 7 is mounted on the lower hammer slide 23, which is configured such that only motion normal to the slot formed by guide plates 29 and 30 and parallel to the plane of base plate 5 is possible, said motion being effected by rotating eccentric nut 117, FIG. 5, while locking screw 118 is in a loosened state. The upper printer hammer assembly 34 and slide 21 together with the lower printer hammer assembly 33 and slide 23 are mounted on hammer adjusting plate 119, said adjusting plate being free to move in a plane parallel to the slot formed by guide plates 29 and 30, said assembly being guided by an elongated opening in base plate 5, appropriately sized to accept the lower protrusion of said hammer adjusting plate, when locking screw 120 is in a loosened state said adjustment being effected by rotating eccentric nut 122. Impact shield 44 is attached to the upper printer hammer solenoid. The upper printer hammer 6 moves in a plane normal to the plane of the slot formed by the guide assemblies 29 and 30, when the upper printer hammer solenoid is energized. Similarly, the lower printer hammer 38 of FIG. 7 moves in a plane normal to the plane of slot 152 when the lower printer hammer solenoid is energized.

The circuitry necessary to provide the function illustrated in FIG. 4 is shown in FIGS. 12 through 26 and may be provided by any commercial available components. Unused inputs of the selected logic elements must be connected to an appropriate voltage source to insure proper operation of the component. Power supply requirements vary significantly with the logic disipline and therefore have not been shown.

RECEIVER 158

Figure 15:
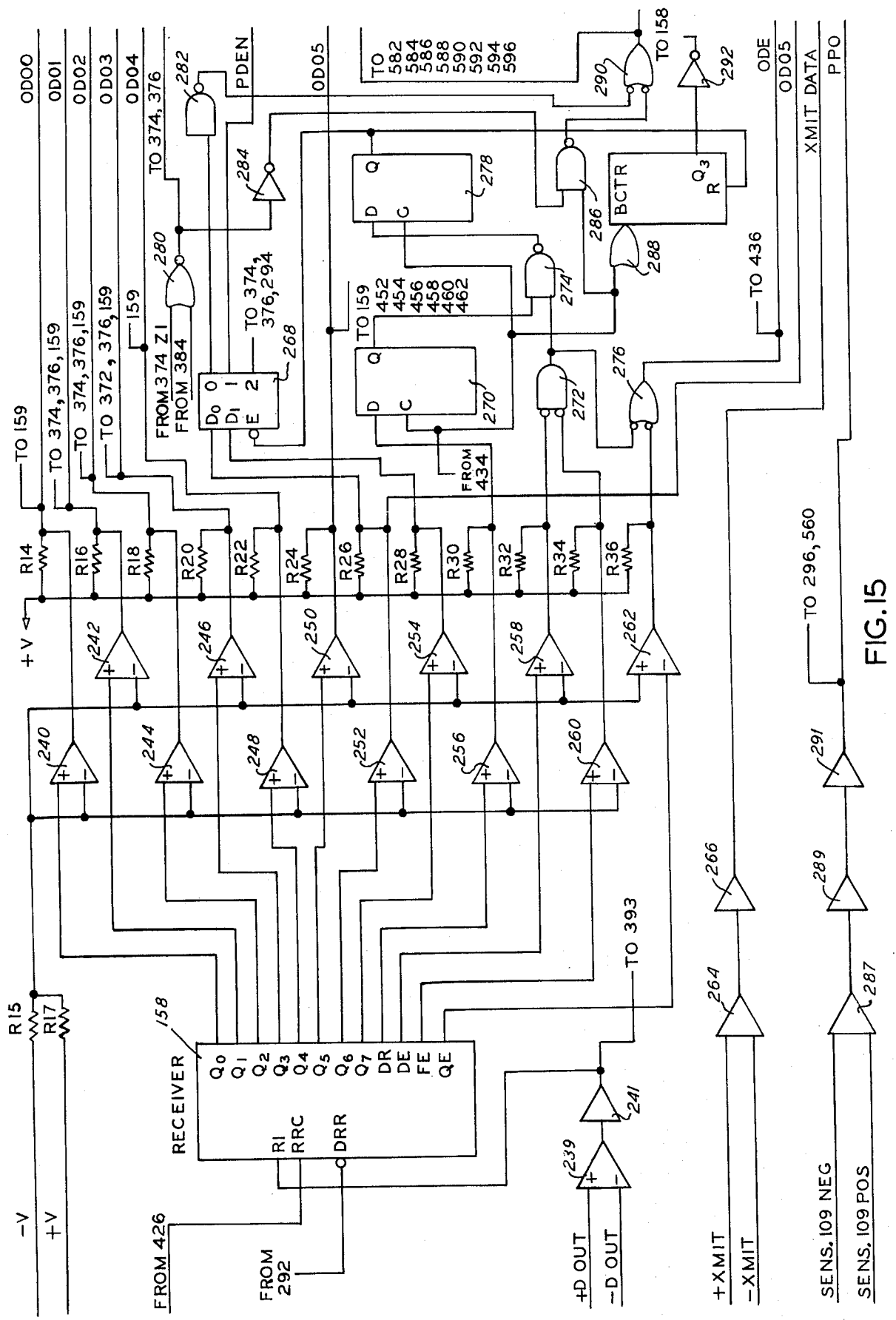
FIG. 15 is an electrical schematic of the receiver 158 function and attendant electronic components.

As illustrated in FIG. 15 line receiver 239 receives differential data from the central processing unit 151 as best seen in FIG. 1. Buffer 241 receives input from differential line receiver 239. Receiver 158 R1 input is provided by buffer 241, RRC input inverter by 450 and DRR input is provided by inveter 292. Differential amplifiers 240 through 262 inclusive provide level translation for the output of receiver 158. The inverting input of said differential amplifiers 240 through 262 inclusive are connected to a reference voltage that is formed by a voltage divider comprising R15 and R17, said resistors R15 and R17 are connected between the power supplies biasing receiver 158. The input to differential amplifier 240 is provided by the Q0 output of receiver 158, input to amplifier 242 the Q1 output, 244 the Q2 output, 246 the Q3 output, 248 the Q4 output, 250 the Q5 output, 252 the Q6 output, 254 the Q7 output, 256 the DR output, 258 the DE output, 260 the FE output and 262 the QE output. Resistors R14, R16, R18, R20, R22, R24, R26, R28, R30, R32, R34 and R36 provide pull up for the output of said differential amplifiers to the most positive logic power supply. Line receiver 264 receives data from central processing unit 151. Buffer 266 receives input from receiver 264, decoder 268 receives input from the output of differential amplifier 252 and the output of differential amplifier 254, and the enable input from flipflop 278 Q output. Flipflop 270 D input is provided by differential amplifier 256 and clock input by inverter 434. NAND element 272 inputs are provided by the output of differential amplifier 258 and differential amplifier 260. NAND element 274 receives input from the Q output of flipflop 270 and from the output of NAND 272. NOR element 276 are provided by element 272 and differential amplifier 262. Flip-flop 278 D input is connected to the output of NAND element 274 and clock input to inverter 434. NOR 280 inputs are provided by decoder 374 Z1 output and inverter 384. NAND element 282 receives input from NOR element 280 and from the zero output of decoder 268. Inverter 284 receives input from NOR element 280. NAND element 286 receives input from inverter 284 and inverter 434. Line receiver 287 receives differential input from magnetic sensor 109. Inverter 289 input is provided by line receiver 287. Inverter 291 input is provided by inverter 289. Counter 288 reset input is provided by the Q output of flipflop 278 and count input by inverter 434. NOR element 290 receives inputs from NAND element 282 and NAND element 286. Inverter 292 receives input from Q3 output of counter 288.

PRINTER BUFFER 159, CONTROL 161 AND PRINTER 162

NOR element 294 as seen in FIG. 18 inputs are provided by the 1 output of decoder 268 and the output of NAND element 358. Printer buffer 159 receives a clock input from the output of NOR element 294, the $D_{ao}$ input is provided by the output of differential amplifier 240; similarly, the $D_{bo}$ input is provided by differential amplifier 242, the $D_{co}$ input differential amplifier 246, the $D_{do}$ input by differential amplifier 248, the $D_{eo}$ input by differential amplifier 250 and the $D_{fo}$ input by differential amplifier 252. Character data buffer 159 re-circulate input is provided by the Q output of flipflop 295. Flipflop 295 clock input is provided by decoder 374 Z3 output. Reset input by NAND 360.

Monostable multivibrator 296 receives input from inverter 291. Flipflop 298 clock input is provided by inverter 291, the D input by the Q output of element 296 and the reset input is provided by $\overline{Q}$ output of element 296. Counter 300 receives clock input from Q output of monostable multivibrator 296, reset input is provided by the Q ouput of flipflop 298. Counter 302 receives input from the Q3 output of counter 300 and a reset input from the Q output of flip-flop 208. Monostable multivibrator 306 input is provided by flip-flop 366 $\overline{Q}$ output and the reset input by NOR 502. Monostable multivibrator 308 receives input from the $\overline{Q}$ output of monostable multivibrator 306 and the reset input from the output of NOR element 502. Monostable multivibrator 310 receives input from the Q2 output of counter 302. Flip-flop 364 receives the clock input from the $\overline{Q}$ output of monostable multivibrator 296, D input from the output of NAND element 346, the set input from the output of exclusive OR 334. Flipflop 366 D input is provided by the Q output of flipflop 366, clock input by flipflop 364 $\overline{Q}$ output, and set input from inverter 384. Monostable multivibrator 368 receives clock input from flipflop 366 Q output and reset input is provided by NOR element 502. Monostable multivibrator 370 receives clock input from $\overline{Q}$ output of monostable multivibrator 368 and the reset input from the output NOR element 502. Counter 312 receives one input from Q2 output of counter 300 and a second input from the Q3 output of counter 312, reset input is provided by the Q output of monostable multivibrator 370. Exclusive OR element 334 inputs are provided by the Q3 output of counter 312 and a positive voltage.

As is further illustrated in FIG. 18, exclusive OR element 314 inputs are provided by the Q0 output of counter 300 and the QA output of printer buffer 159. Exclusive OR 316 inputs are provided by the Q1 output of counter 300 and the QB output of the printer buffer 159. Exclusive OR 318 inputs are provided by the Q2 output of counter 300 and the QC output of printer buffer 159. Exclusive OR 320 inputs are provided by the Q3 output of counter 300 and the $Q_d$ output printer buffer 159. Exclusive OR 322 inputs are provided by the Q0 output of counter 302 and the $Q_e$ output of printer buffer 159. Exclusive OR 324 inputs are provided by the Q1 output of counter 302 and the $Q_f$ output of printer buffer 159. NAND element 322 inputs are provided by exclusive OR 314, exclusive OR 316, exclusive OR 318 and exclusive OR 320. Exclusive OR 334 inputs are provided by flipflop 312 and a positive voltage. NAND element 330 inputs are provided by exclusive OR 322 and exclusive OR 324. NAND element 336 inputs are provided by NAND 332 and NAND element 330. NAND element 304 inputs are provided by printer buffer 159, outputs QA, QB, QC and QD respectively. Inverter 326 receives input from the QE output of said buffer 159. NAND element 338 inputs are provided by the QF output of said buffer 159, NAND element 304 and inverter 326. NAND element 338 inputs are provided by the Q output of monostable multivibrator 308 and NAND element 328. NAND element 340 inputs are provided by the Q output of monostable multivibrator 370 and the Q output of monostable multivibrator 308. NAND element 342 inputs are provided by the Q output of monostable multivibrator 370 and NAND element 328. NOR element 344 inputs are provided by the output of NAND element 336 and NAND element 338. NAND element 346 inputs are provided by NOR element 502, NAND element 340, NOR element 344 and the Q output of flipflop 295. Counter 348 receives count input from the Q output of monostable multivibrator 370 and reset input from the output of inverter 384. Flipflop 350 receives D input from NAND element 340 and the clock input from inverter 434. Flipflop 352 receives D input from the Q output of flipflop 350 and clock input from inverter 434. Flipflop 354 receives D input from the Q3 output of counter 348 and clock input from inverter 434 and reset input from inverter 384. Flipflop 356 receives D input from the Q output of flipflop 354, clock input from inverter 434 and set input from inverter 384. NAND element 358 inputs are provided by the Q output of flipflop 352 and the $\overline{Q}$ output of flipflop 350. NAND element 360 inputs are provided by the Q output of flipflop 354 and the $\overline{Q}$ output of flipflop 356. NAND 362 inputs are provided by NAND 358 and the Q output of flipflop 366.

FIG. 18 further illustrates that element 372 receives a C input from NAND element 338 and the B input is connected to a reference voltage resistor R44, said reference voltage being developed with zener diode D5 and resistor R46, said components being connected to appropriate voltages to provide the desired reference voltage. Element 374 C input is provided by NAND element 342 and the B input is connected to the aforementioned reference voltage through resistor R50. Components 372 and 374 are optical isolators as provided by Monsanto MCT-2. Transistor Q8 base drive is provided by the V0 output of device 372 through resistor R38. The emitter of said transistor Q8 is connected to the printer hammer power source, the collector is connected to the printer hammer power source return through diodes D1 and D2 and to the upper printer hammer solenoid 34. Transistor Q10 base drive is provided by the V0 output of element 374 through resistor R40, the emitter is connected to the printer hammer power source, The collector to the printer hammer power source return through diodes D3 and D4 thereby providing drive for lower printer hammer solenoid 33.

PRICING TERMINAL CONTROLLER 160

The detail of pricing terminal controller is best seen in FIGS. 12, 14, 17, 19 and 22. Monostable multivibrator 176 input is provided by NOR 532. NOR element 178 receives input from monostable multivibrator 176 output and NAND element 222. Flipflop 180 receives set input from NOR element 178, toggle input from NAND element 218 and reset input from monostable multivibrator 216. NOR element 182 inputs are provided by element 509, monostable multivibrator 176 and NAND element 218. Monostable multivibrator 184 input is provided by NOR 182. Binary counter 186 clear input is provided by monostable multivibrator 184, enable input by flipflop 190 Q output and clock input by NAND 196. Binary counter 188 clear input is provided by monostable multivibrator 176 and count input by NAND 218. Optical isolator 192 input is provided by flipflop 190 Q output. The optical isolator is available from numerous commercial sources, typical of which is Monsanto MCT-2. Resistor R10 is connected between a suitable positive voltage and the emitter of Q5. Resistor R11 is connected between said positive voltage and the base of Q5. Pressure roller solenoid 36 input is provided by Q5 collector.

The drive motor electronics consist of PNP darlington transistors Q1 and Q3 and NPN darlington transistors Q2 and Q4 connected in complementary symmetry as shown in FIG. 12. The NPN darlington is typical of JEDEC type 2N6055 and the PNP darlington is typical of JEDEC type 2N6053, however any suitable component may used. Resistors R1, R2, R3 and R4 are connected between the emitter of each transistor and the appropriate power supply. Resisotrs R5, R6, R7 and R8 are connected between the base terminal of the respective darlington transistors and the appropriate power supply. The collectors of each complementary darlington pair are connected together and to a phase winding of the stepper drive motor 39, phases being indicated by the letters A and B. Flipflop 208 receives D input from exclusive OR element 214 and clock input from NAND 196. Flipflop 210 receives D input from exclusive OR element 212 and clock input from NAND 196. Exclusive OR 212 inputs are provided by flipflop 208 $\bar{Q}$ output and flipflop 180 Q output. Exclusive OR 214 inputs are provided by flipflop 210 Q output and flipflop 180 Q output. Optical isolator 200 input is provided by flipflop 208 Q output. Optical isolator 202 input is provided by flipflop 208 $\bar{Q}$ output. Optical isolator 204 input is provided by flipflop 210 Q output. Optical isolator 206 input is provided by flipflop 210 $\bar{Q}$ output. Transistor Q1 base current is provided by optical isolator 200. Transistor Q2 base current is provided by optical isolator 202. Transistor Q3 base current is provided by optical isolator 204. Transistor Q4 base current is provided by optical isolator 206. The aforementioned circuitry is illustrated schematically in FIG. 12 and, with the indicated power supply and input requirements satisfied, produce the time phase sequence of output signals illustrated in FIG. 13.

The input to inverter 194 is provided by the most significant bit (MSB) output of binary counter 186. NAND element 196 inputs are provided by inverter 194, flipflop 190 Q output, and oscillator 198. Oscillator 198 provides 2 khz frequency for the stepper motor driver. NAND element 218 inputs are provided by bar code reader 81 error output and counter 186 MSB. Inverter 220 input is provided by bar code reader 81 error output. NAND element 222 inputs are provided by inverter 220 and binary counter 186 MSB. Monostable multivibrator 216 receives input from inverter 509. Flipflop 190 set input is provided by monostable multivibrator 176 and reset input is provided by NAND 228. NAND 228 receives input from binary counter 188 $2^0$ and $2^1$ outputs. Flipflop 230 set input is provided by NAND 228 and reset input by inverter 232. Annunciator 163 input is provided by flipflop 230 Q output. Inverter 232 input is provided by NOR 532. NAND 234 inputs are provided by flipflop 180 $\bar{Q}$ and NAND 222. Flipflop 226 set input is provided by NAND 234 and reset input by flipflop 190 Q output. Inverter 236 input is provided by binary counter 188 $2^1$ output.

The control electronics for the alternate embodiment for the scanning path modification are illustrated in FIG. 14.

Optical isolator 238 FIG. 14 input is provided by binary counter 188 $2^1$ output. Transistor Q6 base current is provided by optical isolator 238. Resistor R12 is connected between transistor Q6 base and an appropriate positive voltage source. Resistor R13 is connected in series between said positive voltage source and the emitter of transistor Q6. Solenoid S input is provided by transistor Q6 emitter.

FIG. 19 schematically illustrates that flipflop 464 receives clock input from the complement of the sin wave oscillator and reset input from inverter 516. Flipflop 466 receives clock input from the $\bar{Q}$ output of flipflop 464, and reset input from inverter 516. Counter 468 receives clock input from the Q output of flipflop 466 and reset input from inverter 516. NAND 470 inputs are provided by flipflop 466 Q output, counter 468 Q1 output and counter 468 Q 3 output. NAND 472 inputs are provided by flipflop 466 Q output, and outputs Q2, Q5 and Q6 of counter 468. Inverter 474 input is provided by NAND element 472.

Switch array 476 of FIG. 19, as is commercially available and typical of which is AMP hexadecimal switch, has the common terminal of each switch connected to an appropriate voltage source. Counter 478 L input is provided by counter 396 Q3 output, CU input by flipflop 480 $\bar{Q}$ output, CD input by counter 394, Q12, P0 input by switch array 476 1 output, P1 input by switch array 476 2 output, P2 input by switch array 476 3 output and P3 input by switch array 476 4 output. Flipflop 480 clock input is provided by counter 478 and reset input by exclusive OR 526. NOR element 482 inputs are provided by inverter 474 and inverter 384. NOR element 486 inputs are provided by NOR element 482 and NOR element 484. NOR element 484 inputs are provided by inverter 520 and NOR element 486. NAND element 488 inputs are provided by NOR element 484 and NAND 470. Inverter 490 input is provided by NOR element 486. NOR element 492 inputs are provided by NAND element 488 and inverter 384. NOR element 494 inputs are provided by inverter 520 and NOR element 496. NOR element 496 inputs are provided by NOR element 494 and NOR element 492. Inverter 498 input is provided by NOR element 492. NOR element 500 inputs are provided by NAND element 362 and NOR element 502. NOR element 502 inputs are provided by NOR element 500 and NOR element 504. NOR element 504 inputs are provided by inverter 384 and the Q2 output of counter 468. NOR element 506 are provided by the B0 output of counter 478 and NOR element 508. NOR element 508 inputs are provided by NOR element 506 and NOR element 510. Inverter 509 input is provided by right limit sensor 113. Resistor R93 and potentiometer R95 are connected to a negative voltage and provide a variable operating point for sensor 113 by adjustment of said potentometer. NOR element 510 inputs are provided by inverter 384 and inverter 509. NOR element 512 inputs are provided by NOR element 502, NOR element 496 and NOR element 508. Inverter 514 input is provided by NOR element 508. Inverter 516 input is provided by NOR element 512. NAND 528 inputs are provided by sensor pairs 123a – 123b and 123c – 123d. NAND 536 inputs are provided by sensor pairs 123a – 123b and 123c – 123d. The operating point of sensor pair 123a – 123b is adjusted by fixed resistor R90 and potentiometer R92. The operating point of sensor pair 123c – 123d is adjusted by fixed resistor R94 and potentiometer R96. Inverter 530 input is provided by the output of NAND gate 528. NOR element 532 inputs are provided by inverter 530 and NOR element 534. NOR element 534 inputs are provided by NOR element 532 and NAND element of 536. NOR element 518 inputs are provided by the Z3 and Z4 outputs of decoder 374. Inverter 520 input is provided by the Z4 output of decoder 374. NOR element 524 inputs are provided by inverter 520 and by the Q3 output of counter 396. Exclusive OR element 526 inputs are provided by the Q3 output of counter 396, and an appropriate positive voltage. Flipflop 522 clock input is provided by the output of an inverter 514, the D input is connected to an appropriate positive voltage, the reset input is provided by NOR element 524. NOR element 538 inputs are provided by the output of inverter 498 and NAND element 360. NOR element 540 inputs are provided by exclusive OR 526 and NAND 360. NOR 542 inputs are provided by NOR 518 and NOR 546. NOR element 546 inputs are provided by NOR element 542 and by NOR element 538. NOR element 548 inputs are provided by the $\overline{Q}$ output of flipflop 522 and NOR element 550. NOR element 550 inputs are provided by NOR element 548 and by NOR element 540. Inverter 552 input is provided by NOR element 532. Inverter 554 input is provided by NOR element 546. Inverter 556 input is provided by the output of NOR element 550. Inverter 558 input is provided by exclusive OR 526. Monostable multivibrator 560 input is provided by element 291.

As FIG. 22 illustrates, inverter 372 input is provided by differential amplifier 246. Decoder 374 receives the E input from the output of inverter 372, S2 input is provided by the output of differential amplifier 244, S1 input is provided by the output of differential amplifier 242, S0 input is provided by the output of differential amplifier 240 and the I input is provided by the output 2 of decoder 268. Decoder 376 enable input is provided by the output of differential amplifier 246, the S2 input is provided by the output of differential amplifier 244, S1 input is provided by the output of differential amplifier 242, the S0 input is provided by the output of differential amplifier 240 and the 1 input is provided by the 2 output of decoder 268. NOR element 378 as illustrated in FIG. 20 inputs are provided by the Z2 output of decoder 374. Inverter 380 input is provided by the Z2 output of decoder 374. NAND element 382 input is provided by the output of NOR element 378 and the Z2 output of decoder 374. Inverter 384 of FIG. 22 input is provided by the output of NOR element 378. Inverter 388 of FIG. 20 input is provided by the output of commercially available oscillator element 386.

Monostable multivibrator 391 input is provided by element 564. Monostable multivibrator 393 input is provided by element 241.

Flipflop 390 receives D input from the $\overline{Q}$ output of said flipflop and clock input from the output of inverter 388. Counter 392 receives input from the Q output of flipflop 390. Counter 394 receives clock input from the Q3 output of counter 392. Counter 396 receives input from the Q9 output of counter 394 and an input from the Q3 output of counter 396. Counter 400 receives input from the Q13 output of counter 394. Counter 402 receives input from the Q2 output of counter 400. Counter 404 receives input from the Q3 output of counter 402. Flipflop 406 D input is connected to the Q3 output of counter 404, the clock input is provided by inverter 434. NOR element 408 inputs are provided by the $\overline{Q}$ output of flipflop 406 and NOR element 378. Flipflop 410 D input is provided by 256, clock input is provided by 374 Z6 and reset input by 408. Flipflop 412 D input is provided by the read clock output of bar code reader 81, flipflop 412 $\overline{Q}$ output reset by the clear output of bar code reader 81. NAND element 414 inputs are provided by the read clock output of bar code reader assembly 81 and the $\overline{Q}$ output of flipflop 412. Inverter 416 input is provided by the ready output of bar code reader 81. NOR element 418 inputs are provided by NAND 414 and NOR element 420. NOR element 420 inputs are provided by NOR 418, inverter 416, inverter 384 and the reader clear output of bar code assembly 81. Flipflop 422 receives D input from the positive power supply, clock input from the ready output of bar code reader 81, reset input from the Z4 output of decoder 374 and set input from the output of inverter 384. Inverter 424 input is provided by the $\overline{Q}$ output of flipflop 422. Inverter 426 of FIG. 20 input is provided by the Q1 output of counter 392. Inverter 428 input is provided by the Q0 output of counter 392. Inverter 434 input is provided by the Q1 output of counter 392. As illustrated in FIG. 17, inverter 430 input is provided by the output of NOR element 420. Inverter 432 input is provided by the output of inverter 430. Flipflop 436 D input is provided by the output of NOR element 276, the C input is provided by the output of inverter 434. Flipflop 440 D input is provided by the output of inverter 380, the C input is provided by the output of inverter 434 and reset input by NAND 382. NAND element 444 inputs are provided by the output of inverter 380 and the $\overline{Q}$ output of flipflop 440. NAND element 442 inputs are provided by the Q output of flipflop 436 and the output of differential amplifier 564. NOR element 446 inputs are provided by NAND element 442 and NAND element 444. NOR element 448 inputs are provided by NAND element 442 and NOR element 378. Inverter 450 input is provided by inverter 434.

OPERATOR INDICATOR LIGHTS 155

FIG. 22 illustrates that flipflop 452 receives D input from the output of differential amplifier 250, clock input from the Z5 output of decoder 376 and reset input from the output of inverter 384. Flipflop 454 receives D input from the output of differential amplifier 250, clock input from the Z4 output of decoder 376 and reset input is provided by the output of inverter 384. Flipflop 456 receives D input from the output of differential amplifier 250, clock input from the Z3 output of decoder 376 and reset input from the output of inverter 384. Flipflop 458 receives D input from the output of differential amplifier 250, clock input from the output of decoder 376 and reset input from the output of inverter 384. Flipflop 460 receives D input from the output of differential amplifier 250, clock input from the Z1 output of decoder 376 and reset input from the output of inverter 384. Flipflop 462 receives D input from the output of differential amplifier 250, clock input from Z0 output of decoder 376 and reset input from the output of inverter 384.

As FIG. 23 illustrates, transistor Q12 base drive is provided by flipflop 454 Q output via resistor R57, resistor R59 is connected between the base of the transistor and a negative voltage source and the emmiter is connected directly to said negative source. Transistor Q14 base drive is provided by flipflop 452 Q output via resistor R61, resistor R63 is connected between the base of the transistor and a negative voltage source and the emitter is connected directly to said negative source. Transistor Q16 base drive is provided by flipflop 462 Q output via resistor R65, resistor R67 is connected between the base of the transistor and a negative voltage source and the emitter is connected directly to said negative source. Transistor Q18 base drive is provided by flipflop 460 Q output via resistor R69, resistor R71 is connected between the base of the transistor and a negative voltage source and the emitter is connected directly to said negative source. Transistor Q20 base drive is provided by flipflop 468 Q output via resistor R73, resistor R75 is connected between the base of the transistor and a negative voltage source and the emitter is connected directly to said negative source. Transistor Q22 base drive is provided by flipflop 456 Q output via resistor R77, resistor R79 is connected between the base of the transistor and a negative source and the emitter is connected directly to said negative source.

Indicator lights 155 as illustrated in FIGS. 2 and 4 comprise lamps L1 through L12 inclusive as shown in FIG. 23. Note that two lamps are used for each indicator light and, further, that a common terminal of all twelve lamps are connected to a positive voltage source. Lamps L1 and L2 are driven by transistor Q12 collector. The parallel pair of lamps L3 and L4 are driven by transistor Q14 collector. The parallel pair L5 and L6 are driven by transisor Q16 collector. The parallel combination of lamps L7 and L8 are driven by transistor Q18 collector. The parallel combination of lamps L9 and L10 are driven by transistor Q20 collector. The parallel combination of lamps L11 and L12 are driven by transistor Q22 collector.

DIGIT DISPLAYS 164

As illustrated in FIG. 24, inverter 578 input is provided by inverter 284. Selector 580 receives KB input from inverter 578, KA input inverter 284, A0 input from differential amplifier 240, A1 input from differential amplifier 242, A2 input from differential amplifier 246, A3 input from differential amplifier 248. Inputs B0, B1, B2 and B3 are connected together and then to an appropriate positive voltage. Shift register 582 D0 input is provided by the Z0 output of selector 580 and the clock input is provided by the output of NOR 290. Shift register 584 D0 input is provided by the Z1 output of selector 580 and the clock input is provided by the NOR 290. Shift register 586 D0 input is provided by the Z2 output of selector 580 while input is provided by the output of NOR 290. Shift register 588 D0 input is provided by the Z3 output of selector 580 and the clock input is provided by the output of NOR 290. Shift register 590 P0 input is provided by the Q2 output of shift register 582, the clock input being provided by the output of NOR element 290. Shift register 292 P0 input is provided by the Q2 output of shift register 584 and the clock input is provided by the output of NOR element 290. Shift register 594 B0 input is provided by the Q2 output of shift register 586, the clock input being provided by the output of NOR 290. Shift register 596 B0 input is provided by the Q2 output of shift register 588, the clock input being provided by the output of NOR 290. Seven segment decoder driver 598 D0 input is provided by the Q0 output of shift register 582. D1 input is provided by the Q0 output of shift register 582. D1 input is provided by the Q0 output of shift register 584, D2 input is provided by the Q0 output of shift register 586 and D3 input is provided by the Q0 output of shift register 588. Seven segment decoder driver 600, input D0 is provided by the Q0 output of shift register 582, the D1 input is provided by the Q1 output of shift register 584, the D2 input is provided by the Q1 output of shift register 586 and the D3 input is provided by the Q0 output of shift register 588. Seven segment decoder driver 602, input D0 is provided by the Q2 output of shift register 582, the D1 input is provided by the Q2 output of shift register 584, the D2 input is provided by the Q2 output of shift register 586 and the D3 input is provided by the Q2 output of shift register 588. Seven segment decoder driver 604 D0 input is provided by the Q0 output of shift register 590, the D1 input is provided by the Q0 output of shift register 592, the D2 input is provided by the Q0 output of shift register 594 and the D3 input is provided by the Q0 output of shift register 596. Seven segment decoder driver 606 D0 input is provided by the Q1 output of shift register 590, the D1 output is provided by the Q1 output of shift register 592, the D2 input is provided by the Q1 output of shift register 594 and the D3 input is provided by the Q1 output of shift register 596. Seven segment decoder driver 608 B0 input is provided by the Q2 output of shift register 590, the D1 input is provided by the Q2 output of shift register 592, the D2 input is provided by the Q2 output of shift register 594 and the D3 input is provided by the Q2 output of shift register 596. Resistors R100 through R141 provide current limiting for the segments of displays 610, 612, 614, 616, 618 and 620, as schematically represented in FIG. 25. The value of these resistors must be selected to limit the current in the seven segment displays selected. Typical of these resistors is R100. One terminal of resistor R100 is connected to the A output of seven segment decoder driver 598 and the other terminal of resistor 100 is connected to the A input of seven segment display 610. The remaining 43 resistors are similarly connected between the respective terminals of decoder driver and the seven segment displays. Display elements 610 through 620 inclusive are provided by a commercially available component such as Monsanto MAN-2, however any suitable numeric display means may be employed. Display elements 610 through 620 CAP outputs are connected together and then to a suitable bias voltage as may be dictated by the components selected.

KEYBOARD 154

FIG. 26 illustrates that flipflop 622 D and F inputs are provided by data selector 648 Z output and the R input by NAND element 630. The input to monostable multivibrator 624 is provided by the Z output of data selector 648 and the $C_d$ input by NOR gate 378. The input to monostable multivibrator 626 is provided by the Q output of monostable multivibrator 624 and the $C_d$ input by the Z output of data selector 648. The clock input to flip-flop 628 is provided by the Q output of monostable multivibrator 626 and the reset input by the output of inverter 634. The inputs to NAND element 630 are provided by the Q output of flipflop 628 and by the Q output of monostable multivibrator 624. The inputs to NOR element 632 are provided by inverter 384 and by a keyboard clear function provided to the subassembly. The input to inverter 634 is provided by NOR element 632. The inputs to NOR element 636 are provided by flipflop 622 Q output and the T filter comprising R142, R144 and C1, said T filter being connected as schematically illustrated in FIG. 26. The input to inverter 638 is provided by the output of NOR gate 636. The interconnection of elements 622, 636, 638, R142, R144 and C1 provide a gated oscillator function. Counter 640 input is provided by inverter 638. The input to inverter 642 is provided by the Q3 output of counter 640. Power switch 644 E input is provided by the output of inverter 642 and input S1 is connected to an appropriate positive voltage. Element 646 E input is provided by the Q3 output of counter 640 and S1 input is connected to an appropriate positive voltage. Switches S1 through S15 comprise the operator keyboard 154. This component is commercially available as supply by Cherry Electric Products Model M61-0100. The common inputs for switches S1 through S7 are provided by the S2 output of power switch 644. The common input for switches S9 through S15 are provided by the output of power switch 646. Data selector 648 receives inputs as follows: the S0 input is provided by the Q0 output of counter 540, the S1 input is provided by the Q1 output of counter 640 and the S2 input is provided by the Q2 output of counter 640, input I0 is connected to switches S0 and S8, input I1 is connected to switches S1 and S9, input I2 is connected to switches S2 and S10, input I3 is connected to switches S3 and S11, input I4 is connected to switches S4 and S12, input I5 is connected to switches S5 and S13, input I6 is connected to switches S6 and S14 and input I7 is connected to switch S8.

TRANSMITTER 165

As illustrated in FIG. 16, data selector 650 S0 input is provided by the output of inverter 643, the S1 input is provided by the output of inverter 645, input 2X is provided by sensor assembly 81 0 output, input 2Y is provided by sensor 81 output 1, input 3X is provided by the Q0 output of counter 640 and the 3Y input by 640 Q1 output. Data selector 652 S0 input is provided by the output of inverter 643, input S1 is provided by the output of inverter 645, input 2X is provided by the output of sensor 81 output 2, input 2Y is provided by sensor 81 output 3, input 3X is provided by counter 640 Q2 output and input 3Y is provided by counter 640 output Q3. Selectror 654 S0 input is provided by the output of inverter 643, input S1 is provided by output of inverter 645, input 2X is provided by sensor 81 output 4 and input 2Y is provided by sensor 81 output 5. NOR element 573 inputs are provided by the Q output of flipflop 628 and the ready output of sensor 81 and the ready output of other packer functions. Inverter 575 input is provided by NOR gate 573. Flipflop 577 D input is provided by inverter 575, the set input is provided by the HDR output of the address decoder. Inverter 566 input is provided by the Q output of flipflop 577. Inverter 568 input is provided by the output of flipflop 577. Transmitter 165, as best shown in FIGS. 4 and 16, receives MR input from NOR element 446, the TRC input from inverter 426, the TBRL input is supplied to the subassembly, the D0 input from the ZX output of data selector 650, the D1 input from the ZY output of data selector 650, the D2 input from the ZX output of data selector 652, the D3 input from the ZY output of data selector 652, the D4 input from the ZX output of data selector 654, the D5 input from the ZY output of data selector 654, the D6 input from the output of inverter 243 and the D7 input from the output 245. The input to inverters 243 and 245 are provided to the subassembly. Differential amplifiers 562 noninverting input is provided by the TRO output of transmitter 165. The noninverting input is connected to a positive reference voltage formed by the aforementioned resistive voltage divider comprising R15 and R17. The noninverting input to differential amplifier 564 is provided by the TRE output of transmitter 165. The inverting input of differential amplifier 564 is connected to a positive reference voltage formed by the aforementioned resistive voltage divider comprising R15 and R17. Differential transmitter 574 B2 input is provided by inverter 566 and the B1 input is provided by inverter 568. The differential data ready signal is provided to computer 151, as best seen in FIG. 1, by differential transmitter 574. Inverter 570 input is provided by differential amplifier 562. Inverter 572 input is provided by differential amplifier 562. Differential transmitter 576 A2 input is provided by inverter 570 and the A1 input is provided by inverter 572. The differential data is transmitted to computer 151, as best seen in FIG. 1, by the output of differential transmitter 576.

DESCRIPTION OF OPERATION

The operation of the apparatus begins when the operator places carrier 153 into slot 152 provided in the pricing terminal 150 as shown in FIG. 3. At this time emitter sensor pairs 123a–123b and 123c–123d shown in FIG. 5 detect that carrier 153 has been inserted in slot 152, as best shown in FIG. 3. Flipflop 190 is set by action of NAND elements 528 and 536 and thereby engages solenoid 36, clears binary counter 186 and sets flipflop 523. The motor drive electronics, best seen in FIG. 12a, cause drive motor 39 to transport carrier 153 to the right. The transportation continues until the right limit sensor 113 detects said carrier 153. At this time flipflop 523 is reset and binary counter 186 is cleared. Carrier 153 is then transported to the left while sensor 81b scans bar code 157 as best seen in FIG. 3. The transportation continues until counter 186 most significant bit changes to a high state, thus stopping the transportation. Sensor electronics 81 output is sampled to determine if an acceptable read was accomplished.

Assuming that an acceptable read was accomplished, flipflop 577 is set and differential transmitter 574 signals computer 151 that data is ready. Computer 151 then addresses the pricing terminal 150 thereby causing data selectors 650 through 654 inclusive, to input sensor 81 data to transmitter 165. Transmitter 165 converts the input data to a serial format and transmits via differential transmitter 576. Computer 151 repeats the above cycle until all data has been transferred.

Computer 151 outputs data to differential receiver 239 and then to receiver 158. Receiver 158 converts the data from serial to a parallel format and outputs to control function decoder 160 comprising decoders 374 and 376. The transmitted data is decoded and input to the appropriate storage buffer which includes printer buffer 159, annunciator 163, digit display 156 or operator indicator lights 155.

Carrier 153 is at the left extremity of slot 152. Drive motor 39 is caused to transport carrier 153 to the right when data input to printer buffer 159 is complete. With print wheel 31, as best seen in FIG. 5, rotating magnet sensor 109 detects timing marks and causes monostable multivibrator 296 to input character wheel position information to counter 300. The characters are arranged on print wheel 31 in order of their ASCII codes. Therefore, the output of counter 300 is a direct representation of the ASCII code of the character that is in line with printer hammers 38 and 6, as best seen in FIG. 7. The output of counter 300 is compared with the output of printer buffer 159 by the comparator comprising exclusive OR elements 314 through 324 inclusive, and NAND elements 330, 332 and 336. Therefore, when the print wheel 31 position is such that the character represented by the ASCII code stored in printer buffer 159 is in printing position, the appropriate printer hammer will be energized thus causing the character to be printed. To save time, space codes are detected and immediately passed over. This is accomplished by a space code detector comprising NAND element 304, inverter 326 and NAND element 328. Immediately upon printing a character or detecting a space, printer buffer 159 is indexed to the next character to be printed. This is accomplished by action of flipflop 350, 352 and NAND element 358. The column position information is maintained in counter 348 and flipflop 354 and 365 and NAND gate 360. Upon completion of printing pressure roller solenoid 36 is released, thus allowing the operator to remove envelope 153 from slot 152 thus completing the reading/printing cycle.

Computer 151 may also display information on the operator indicator light 155, as best seen in FIG. 4. This is accomplished by outputing information to the pricing terminal 150 through receiver 158 and control function decoder 160 comprising decoders 374 and 376. The information to be displayed is stored in the operator indicator light buffer comprising fliflops 452 through 462 inclusive. The output of said flipflops is provided to transistor drivers Q12 through Q22 inclusive and then to operator indicator lights 155 comprising lamps L1 through L12 inclusive. Information so displayed indicates the prce, quantity, type order, dealer and schedule to the operator of pricing terminal 150.

Digit data is displayed by elements 156 as best seen in FIG. 4. The information for digit display 156 is transmitted by computer 151 to pricing terminal 150 via receiver 158 and control function decoders 160. Information for display in this manner is stored in buffer registers 582 through 596 inclusive. Decoder drivers 598 through 608 inclusive receive data from the digit display buffer and transform the information to the appropriate code for the seven segment displays 156 comprising display elements 610 through 620 inclusive.

The indication of a read attempt of unacceptable quality will immediately initiate re-read attempt by incrementing counter 188 and then reversing drive motor 39 as best shown in FIGS. 8 and 4, thus causing the carrier to be moved left to right under the lower sensor assembly 81b. Said transportation continuing until inhibited by counter 186 most significant bit as best seen in FIG. 12. The sensor electronics 81 read quality output line is again interrogated. Assuming that a satisfactory read was accomplished on the first reread, the data is transferred to the central processor and printing data is returned. Drive motor 39 is operated to cause carrier 153 to be moved to the left extremity of slot 152 and then drive motor 39 is reversed causing a left to right translation during which time the aforementioned printing cycle is completed. In the event that an unsuccessful read resulted from the first rescan, counter 188, as best seen in FIG. 12, is incremented thus enabling upper sensor assembly 81a and disabling lower sensor assembly 81b to effect a rescan of bar code 157 as best seen in FIG. 3 on a different path.

Completion of the second rescan will find carrier 153 at the left extremity of the reader/printer apparatus and presenting two alternatives. Considering that the second rescan was successful, a data exchange between pricing terminal 150 and computer 151 is completed followed immediately by the aforementioned print cycle.

The final alternative being that the second rescan was unsuccessful. Flipflop 230 is set when binary counter 188 reaches a count of 3 indicating that 3 scans have been attempted. Flipflop 230 activates annunciator 163 indicating to the operator that the maximum number of rescans have been exhausted without successfully reading indicia 157 printed on carrier 153. Pressure roller 12 is retracted to allow removal of the problematical carrier 153. Annunciator 163 is silenced when the operator removes carrier 153 from slot 152.

The bar code 157 on carrier 153 is manually scanned by the operator and the data input to the pricing terminal 150 through keyboard 154 as follows: Keyboard 154 is schematically represented by the switch array as best seen in FIG. 26. Counter 640 generates addresses for data selector 648, thereby performing a constant scan of the output of switches S10. Counter 640 is inhibited when a depressed key is found and the keyboard ready signal is output from flipflop 628 and is combined a flipflop 577 to provide a data ready input to computer 151 through differential transmitter 574. Computer 151 will generate an address to enable the keyboard data to be input to transmitter 165 through data selector comprising elements 650 through 654. Again the transmitter 165 will perform the parallel to serial data transmission and transmit data to computer 151 via differential transmitter 576. This transmission of data continues until the operator depresses the enter key on switch array S10 and thereby terminating the transmission from the keyboard 154 to the computer 151.

With the manually entered data in the computer, the carrier 153 is again inserted in slot 152 and at this time computer 151 will cause the carrier 153 to be transported to the left extremity of slot 152 and following a print data transmission completion as previously described will cause the printer mechanism comprising a printer buffer 159, the printer control 160 and the printer 162, as best shown in FIG. 4, to print the desired data upon carrier 153. At the completion of the print cycle pressure roller 12 is retracted to allow carrier 153 to be removed from slot 152.

It will, of course, be understood that various changes may be made in the form, details, arrangement and proportions of the parts without departing from the scope of this invention, which generally stated is set forth in the appended claims.

What is claimed is:

1. A system for reading machine-readable information from a carrier and printing information onto the carrier, said system comprising:
    guide path defining means for defining a guide path for the carrier,
    motive means for moving the carrier along the guide path,
    reader means disposed along the guide path for reading the machine readable information from the carrier as the carrier is moved along the guide path past the reader means and indicating whether the reading of the machine readable information was successful or unsuccessful,
    storage means for storing information to be printed on the carrier depending on the machine-readable information on the carrier which is read by the reader means,
    printer means disposed along the guide path for printing information from the storage means,
    enable means for enabling the printer means to print the information from the storage means when the reader means indicates it has successfully read the machine readable information, and
    read-repeat means for causing the motive means again to move the carrier along the guide path and causing the reader means to re-read the machine-readable information if the reader means indicates that a previous attempt to read the same has been unsuccessful.

2. The system of claim 1 and further comprising:
    termination means for terminating attempts to read the machine readable information after a predetermined number of unsuccessful attempts.

3. The system of claim 2 and further comprising:
    annunciator means for changing from a first to second state when the termination means terminates attempts to read.

4. The system of claim 1 wherein the machine readable information is in the form of a code pattern.

5. The system of claim 4 further comprising means for changing the relative position of the reader means with respect to the code pattern during successive re-read attempts.

6. The system of claim 5 wherein the means for changing the relative position of the reader means produces an alternate scanning path for successive re-scans, and further comprising:
    control means for selecting said alternate scanning paths.

7. The system of claim 6 wherein said means for changing the relative position includes:
    a plurality of individual read means spaced apart for reading the code pattern along different scanning paths, and
    controlling means for selecting said read means for each repeat attempt.

8. The system of claim 6 wherein said means for changing the relative position includes means to reposition said reader means and further comprising:
    control means to govern the position of said reader means to read repeat attempts.

9. The system of claim 1 wherein the read repeat means causes the motive means to reverse the direction of motion of the carrier along the guide path of the carrier with respect to the reader means and the printer means and causes the reader means to read the machine-readable information while the carrier is being moved in the reverse direction.

10. The system of claim 1 wherein the reader means and the printer means are in fixed relation to one another.

11. The system of claim 10 wherein the reader means and the printer means are disposed in fixed relation to the guide path.

12. The system of claim 11 and guiding means located at said printer means for guiding carriers with obstructions therein into and through said printer means.

13. The system set forth in claim 12 wherein said printer means includes a pair of opposed printer members, one of which is a printer wheel with characters positioned around the circumference thereof, and the other is a printer hammer, and said guiding means including a spacer strip interposed between said wheel and said hammer and having a print-through opening therein in registration with the printer hammer to guide the carrier past said print wheel while permitting the hammer to pass therethrough to produce the printing operation.

14. The system set forth in claim 13 and further comprising the position of the opening relative to the printer wheel and hammer.

15. The structure set forth in claim 14 wherein said opening has one end portion thereof gradually diminishing in width along the guide path to assist in guiding the carrier past said printer wheel.

16. A method of reading price determining machine-readable information on a carrier, and printing price information in human readable form, the method comprising:
    storing price information associated with the machine-readable information,
    moving the carrier along a guide path past a reader of machine-readable information,
    attempting to read the machine-readable information on the carrier with the reader as the carrier is moved past the reader,
    indicating whether the attempted reading was successful or unsuccessful,
    enabling, if the attempted reading is successful, the printing in human readable form of the price information associated with the machine-readable information read,
    attempting to read again by moving the carrier again along the guide path past the reader if a previous reading attempt is unsuccessful, and
    terminating attempts to read after a predetermined number of attempts.

17. The method of claim 16 wherein the attempting to read again occurs while the carrier is moving along the guide path in a reverse direction from the direction it was moving during the preceding attempt to read.

* * * * *